US012613423B2

(12) United States Patent
Kreiner

(10) Patent No.: US 12,613,423 B2
(45) Date of Patent: Apr. 28, 2026

(54) ILLUMINATION UNIT, METHOD FOR PRODUCING AN ILLUMINATION UNIT, CONVERTER ELEMENT FOR AN OPTOELECTRONIC COMPONENT, RADIATION SOURCE INCLUDING AN LED AND A CONVERTER ELEMENT, OUTCOUPLING STRUCTURE, AND OPTOELECTRONIC DEVICE

(71) Applicant: OSRAM Opto Semiconductors GmbH, Regensburg (DE)

(72) Inventor: Laura Kreiner, Regensburg (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 686 days.

(21) Appl. No.: 17/595,307

(22) PCT Filed: May 14, 2020

(86) PCT No.: PCT/EP2020/063405
§ 371 (c)(1),
(2) Date: Nov. 12, 2021

(87) PCT Pub. No.: WO2020/229576
PCT Pub. Date: Nov. 19, 2020

(65) Prior Publication Data
US 2022/0197041 A1      Jun. 23, 2022

(30) Foreign Application Priority Data

May 14, 2019   (DE) ..................... 10 2019 112 616.9
May 14, 2019   (DE) ..................... 10 2019 112 639.8
(Continued)

(51) Int. Cl.
G02B 27/09       (2006.01)
G02B 1/00        (2006.01)
G02B 27/30       (2006.01)

(52) U.S. Cl.
CPC ........... *G02B 27/095* (2013.01); *G02B 1/005* (2013.01); *G02B 27/0922* (2013.01); *G02B 27/30* (2013.01)

(58) Field of Classification Search
CPC ................ H01L 25/0753; H01L 33/32; H01L 2944/0091; H01L 33/08; H01L 33/20;
(Continued)

(56) References Cited

U.S. PATENT DOCUMENTS 4,897,614 A     1/1990   Nishio
4,979,002 A     12/1990  Pankove
(Continued)

FOREIGN PATENT DOCUMENTS

DE          19744793 A1     4/1998
DE          19751649 A1     5/1999
(Continued)

OTHER PUBLICATIONS

Joannopoules. Photonic crystals: putting a new twist on light. Nature, vol. 386113, 1997 (Year: 1997).*
(Continued)

*Primary Examiner* — Galina G Yushina
(74) *Attorney, Agent, or Firm* — ArentFox Schiff LLP

(57) ABSTRACT
An illumination unit includes: at least one optoelectronic emitter unit which emits electromagnetic radiation via a light-emitting surface, and a photonic structure for beam shaping of the electromagnetic radiation before it exits via the light emitting surface, wherein the photonic structure shapes the electromagnetic radiation such that the electromagnetic radiation has a certain far field.

10 Claims, 14 Drawing Sheets

(30) Foreign Application Priority Data

Figure 1:
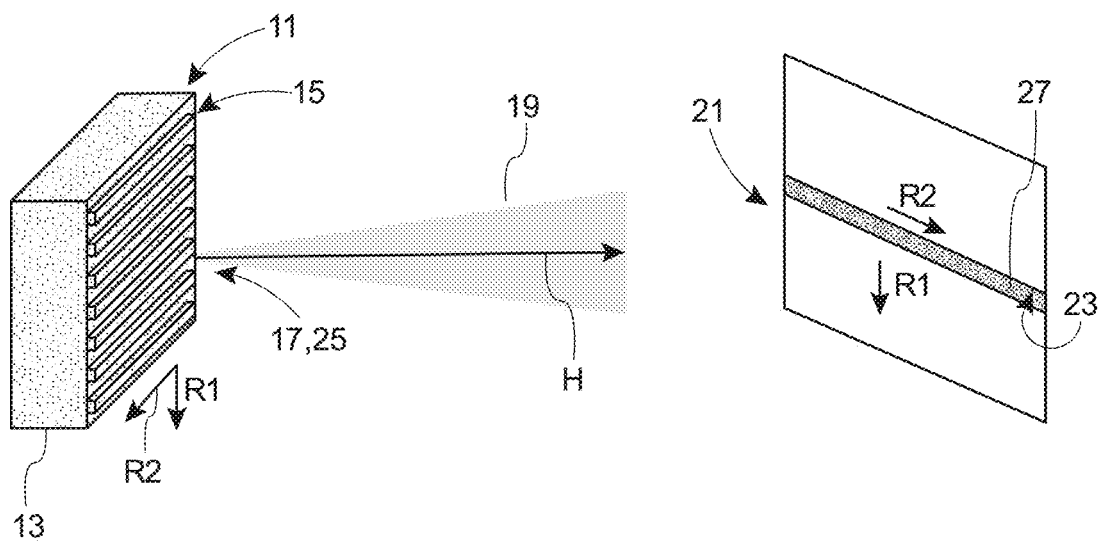

| Jun. 12, 2019 | (DE) | .................... 10 2019 115 991.1 |
| Jun. 14, 2019 | (DE) | .................... 10 2019 116 313.7 |
| Jul. 5, 2019 | (DE) | .................... 10 2019 118 251.4 |
| Jan. 29, 2020 | (WO) | ................ PCT/EP2020/052191 |

(58) Field of Classification Search
  CPC ......... H01L 33/24; H01L 33/44; H01L 33/58;
        H01L 2933/0083; H01L 33/508; H01L
            33/505; H01L 2933/0041; H01L
        2933/0058; G02B 27/095; G02B 1/005;
            G02B 27/0922; G02B 27/30; G02B
        1/002; G02B 5/30; G01B 11/2513; H10H
            20/8516; H10H 20/813; H10H 20/821;
                H10H 20/84; H10H 20/855; H10H
            20/825; H10H 20/872; H10H 20/882;
        H10H 20/8514; H10H 20/0361; H10H
                                    20/0363
  See application file for complete search history.

(56) References Cited

U.S. PATENT DOCUMENTS

| 5,103,271 | A | 4/1992 | Izumiya et al. | |
| 5,526,063 | A | 6/1996 | Joubert et al. | |
| 5,537,171 | A | 7/1996 | Ogino et al. | |
| 5,858,814 | A | 1/1999 | Goossen et al. | |
| 6,048,751 | A | 4/2000 | D'Asaro et al. | |
| 6,316,286 | B1 | 11/2001 | Trezza | |
| 6,527,456 | B1 | 3/2003 | Trezza | |
| 6,531,328 | B1 | 3/2003 | Chen | |
| 7,067,339 | B2 | 6/2006 | Biwa et al. | |
| 7,101,050 | B2 | 9/2006 | Magarill et al. | |
| 7,254,282 | B2 | 8/2007 | Sathyanarayana | |
| 7,390,097 | B2 | 6/2008 | Magarill | |
| 7,808,005 | B1 | 10/2010 | Fattal et al. | |
| 8,049,233 | B2 | 11/2011 | Fukshima et al. | |
| 8,269,238 | B2 | 9/2012 | Kim et al. | |
| 8,349,116 | B1 | 1/2013 | Bibl et al. | |
| 8,586,965 | B2 | 11/2013 | Toyoda et al. | |
| 8,729,580 | B2 * | 5/2014 | Lester | H10H 20/841 |
| | | | | 257/E33.072 |
| 9,202,988 | B2 | 12/2015 | Yoshida et al. | |
| 9,318,645 | B2 | 4/2016 | Tani et al. | |
| 9,368,683 | B1 | 6/2016 | Meitl et al. | |
| 9,437,782 | B2 | 9/2016 | Bower et al. | |
| 9,444,015 | B2 | 9/2016 | Bower et al. | |
| 9,520,537 | B2 | 12/2016 | Bower et al. | |
| 9,698,308 | B2 | 7/2017 | Bower et al. | |
| 9,705,042 | B2 | 7/2017 | Bower et al. | |
| 9,923,013 | B1 | 3/2018 | Yamashita et al. | |
| 9,991,423 | B2 | 6/2018 | Bower et al. | |
| 9,997,102 | B2 | 6/2018 | Rotzoll et al. | |
| 10,069,036 | B2 | 9/2018 | Atanackovic | |
| 10,096,585 | B2 | 10/2018 | Tanaka et al. | |
| 10,147,849 | B2 | 12/2018 | Xu et al. | |
| 10,162,182 | B2 | 12/2018 | Jepsen | |
| 10,177,195 | B2 | 1/2019 | Ahmed et al. | |
| 10,224,460 | B2 | 3/2019 | Bower et al. | |
| 10,395,589 | B1 | 8/2019 | Vahid Far et al. | |
| 10,396,241 | B1 | 8/2019 | Perkins | |
| 10,405,406 | B2 | 9/2019 | Liszt | |
| 10,418,517 | B2 | 9/2019 | Atanackovic | |
| 10,446,719 | B2 | 10/2019 | Bower et al. | |
| 10,466,487 | B2 | 11/2019 | Blum et al. | |
| 10,490,695 | B2 | 11/2019 | Gomez-Iglesias et al. | |
| 10,522,787 | B1 | 12/2019 | Montgomery et al. | |
| 10,622,514 | B1 | 4/2020 | Atanackovic | |
| 10,802,334 | B2 | 10/2020 | Kim et al. | |
| 10,833,225 | B2 | 11/2020 | Bower et al. | |
| 10,903,193 | B2 | 1/2021 | Yamada | |
| 10,963,103 | B1 | 3/2021 | Shahmohammadi | |
| 10,985,143 | B2 | 4/2021 | Bower et al. | |
| 11,156,759 | B2 | 10/2021 | Brick et al. | |

| 11,300,827 | B2 | 4/2022 | Hwang et al. | |
| 11,302,248 | B2 | 4/2022 | Halbritter | |
| 11,367,807 | B2 | 6/2022 | Wada et al. | |
| 11,513,275 | B2 | 11/2022 | Brick et al. | |
| 11,538,852 | B2 | 12/2022 | Varghese et al. | |
| 11,552,057 | B2 | 1/2023 | Chae et al. | |
| 12,176,461 | B2 | 12/2024 | Chen et al. | |
| 2002/0072138 | A1 | 6/2002 | Trezza et al. | |
| 2002/0074553 | A1 | 6/2002 | Starikov et al. | |
| 2003/0013230 | A1 | 1/2003 | Dudoff et al. | |
| 2003/0141507 | A1 | 7/2003 | Krames et al. | |
| 2003/0189125 | A1 | 10/2003 | Trierenberg | |
| 2004/0146219 | A1 | 7/2004 | Sathyanarayana | |
| 2004/0150979 | A1 | 8/2004 | Lambertini et al. | |
| 2004/0189627 | A1 | 9/2004 | Shirasaki et al. | |
| 2005/0174768 | A1 | 8/2005 | Conner | |
| 2005/0194598 | A1 | 9/2005 | Kim et al. | |
| 2005/0237488 | A1 | 10/2005 | Yamasaki et al. | |
| 2005/0264472 | A1 | 12/2005 | Rast | |
| 2006/0002247 | A1 | 1/2006 | Kim et al. | |
| 2006/0043402 | A1 | 3/2006 | Suehiro et al. | |
| 2006/0163435 | A1 | 7/2006 | Russom et al. | |
| 2006/0192225 | A1 | 8/2006 | Chua et al. | |
| 2007/0012940 | A1 | 1/2007 | Suh et al. | |
| 2007/0057249 | A1 | 3/2007 | Kim et al. | |
| 2007/0096127 | A1 | 5/2007 | Pattison et al. | |
| 2007/0252132 | A1 | 11/2007 | Kamins et al. | |
| 2008/0061304 | A1 | 3/2008 | Huang et al. | |
| 2008/0160725 | A1 | 7/2008 | Byun et al. | |
| 2009/0045416 | A1 | 2/2009 | Bierhuizen et al. | |
| 2009/0101897 | A1 | 4/2009 | Murphy et al. | |
| 2009/0140272 | A1 | 6/2009 | Beeson et al. | |
| 2009/0229097 | A1 | 9/2009 | Crandemire | |
| 2009/0291237 | A1 | 11/2009 | Park et al. | |
| 2009/0315054 | A1 | 12/2009 | Kim et al. | |
| 2010/0019693 | A1 | 1/2010 | Hoogzaad et al. | |
| 2010/0019697 | A1 | 1/2010 | Korsunsky et al. | |
| 2010/0163894 | A1 | 7/2010 | Uemura et al. | |
| 2010/0252103 | A1 | 10/2010 | Yao et al. | |
| 2010/0317132 | A1 | 12/2010 | Rogers et al. | |
| 2011/0037094 | A1 | 2/2011 | Lin et al. | |
| 2011/0151602 | A1 | 6/2011 | Speier | |
| 2011/0156070 | A1 | 6/2011 | Yoon et al. | |
| 2011/0198653 | A1 | 8/2011 | Cho | |
| 2011/0204327 | A1 | 8/2011 | Hiruma et al. | |
| 2011/0254043 | A1 | 10/2011 | Negishi et al. | |
| 2011/0263054 | A1 | 10/2011 | Yu et al. | |
| 2011/0291115 | A1 | 12/2011 | Kim et al. | |
| 2011/0297975 | A1 * | 12/2011 | Yeh | G03B 21/005 |
| | | | | 257/E27.12 |
| 2012/0012622 | A1 | 1/2012 | Sundbaum | |
| 2012/0126229 | A1 | 5/2012 | Bower | |
| 2012/0223289 | A1 | 9/2012 | Gwo et al. | |
| 2012/0223873 | A1 | 9/2012 | Ohta | |
| 2012/0224148 | A1 * | 9/2012 | Natsumeda | H04N 9/3152 |
| | | | | 353/30 |
| 2012/0248477 | A1 * | 10/2012 | Tischler | H10H 20/825 |
| | | | | 257/89 |
| 2012/0261642 | A1 | 10/2012 | Bergenek et al. | |
| 2013/0063413 | A1 | 3/2013 | Miyake | |
| 2013/0063815 | A1 | 3/2013 | Kubota | |
| 2013/0082624 | A1 | 4/2013 | Brassfield et al. | |
| 2013/0119424 | A1 | 5/2013 | Kang et al. | |
| 2013/0154498 | A1 | 6/2013 | Missbach | |
| 2013/0208273 | A1 | 8/2013 | Dominguez-Caballero et al. | |
| 2013/0224892 | A1 * | 8/2013 | Chen | H10H 20/018 |
| | | | | 438/29 |
| 2013/0249972 | A1 | 9/2013 | Nishino et al. | |
| 2013/0256708 | A1 | 10/2013 | Jin et al. | |
| 2013/0328066 | A1 | 12/2013 | Sabathil et al. | |
| 2014/0008677 | A1 | 1/2014 | Zhu et al. | |
| 2014/0111559 | A1 | 4/2014 | Yang et al. | |
| 2014/0124806 | A1 * | 5/2014 | Lester | H01L 33/46 |
| | | | | 257/98 |
| 2014/0131753 | A1 | 5/2014 | Ishida et al. | |
| 2014/0159064 | A1 | 6/2014 | Sakariya et al. | |
| 2014/0231841 | A1 | 8/2014 | Wang | |
| 2014/0319560 | A1 | 10/2014 | Tischler | |
| 2014/0340900 | A1 | 11/2014 | Bathurst et al. | |

(56) References Cited

U.S. PATENT DOCUMENTS

| | | |
|---|---|---|
| 2015/0018609 A1 | 1/2015 | Forsell |
| 2015/0103070 A1 | 4/2015 | In et al. |
| 2015/0103404 A1 | 4/2015 | Rudy et al. |
| 2015/0162560 A1 | 6/2015 | Chen et al. |
| 2015/0186099 A1 | 7/2015 | Hall |
| 2015/0187991 A1 | 7/2015 | McGroddy et al. |
| 2015/0207399 A1 | 7/2015 | Li et al. |
| 2015/0213756 A1 | 7/2015 | Wacyk |
| 2015/0221835 A1 | 8/2015 | Tischler et al. |
| 2015/0280086 A1 | 10/2015 | Jang et al. |
| 2015/0293302 A1 | 10/2015 | Czornomaz et al. |
| 2015/0325598 A1 | 11/2015 | Pfeuffer et al. |
| 2016/0013167 A1 | 1/2016 | Sakariya et al. |
| 2016/0155892 A1 | 6/2016 | Li et al. |
| 2016/0172253 A1 | 6/2016 | Wu et al. |
| 2016/0185277 A1 | 6/2016 | Cho et al. |
| 2016/0240159 A1 | 8/2016 | Ohkawa et al. |
| 2016/0315218 A1 | 10/2016 | Bour et al. |
| 2016/0341942 A1 | 11/2016 | Cheon et al. |
| 2016/0351539 A1 | 12/2016 | Bower et al. |
| 2017/0005151 A1 | 1/2017 | Kim et al. |
| 2017/0061878 A1 | 3/2017 | Park et al. |
| 2017/0082263 A1 | 3/2017 | Byrnes et al. |
| 2017/0084775 A1 | 3/2017 | Li et al. |
| 2017/0170360 A1 | 6/2017 | Bour et al. |
| 2017/0179097 A1 | 6/2017 | Zhang et al. |
| 2017/0179192 A1 | 6/2017 | Zhang et al. |
| 2017/0186740 A1 | 6/2017 | Cok et al. |
| 2017/0186908 A1 | 6/2017 | Robin et al. |
| 2017/0254518 A1 | 9/2017 | Vasylyev |
| 2017/0270852 A1 | 9/2017 | Meitl et al. |
| 2017/0278733 A1 | 9/2017 | Chang et al. |
| 2017/0287402 A1 | 10/2017 | Toyomura et al. |
| 2017/0338372 A1 | 11/2017 | Teraguchi et al. |
| 2017/0345867 A1 | 11/2017 | Chaji et al. |
| 2017/0352309 A1 | 12/2017 | Chang et al. |
| 2017/0352313 A1 | 12/2017 | Miyake |
| 2017/0371087 A1 | 12/2017 | You et al. |
| 2018/0005562 A1 | 1/2018 | Lin et al. |
| 2018/0012540 A1 | 1/2018 | Hosoyachi et al. |
| 2018/0024412 A1 | 1/2018 | Kim et al. |
| 2018/0033767 A1 | 2/2018 | Yu et al. |
| 2018/0033768 A1 | 2/2018 | Kumar et al. |
| 2018/0075798 A1 | 3/2018 | Nho et al. |
| 2018/0084614 A1 | 3/2018 | Bower et al. |
| 2018/0090058 A1 | 3/2018 | Chen et al. |
| 2018/0097033 A1 | 4/2018 | Ahmed et al. |
| 2018/0114878 A1 | 4/2018 | Danesh et al. |
| 2018/0118478 A1 | 5/2018 | Yamaguchi |
| 2018/0122978 A1* | 5/2018 | Khatibzadeh .......... H04B 10/40 |
| 2018/0138071 A1 | 5/2018 | Bower et al. |
| 2018/0180249 A1 | 6/2018 | Yamada et al. |
| 2018/0182298 A1 | 6/2018 | Jang et al. |
| 2018/0211595 A1 | 7/2018 | Takahashi et al. |
| 2018/0211945 A1 | 7/2018 | Cok et al. |
| 2018/0219144 A1 | 8/2018 | Perkins et al. |
| 2018/0226386 A1 | 8/2018 | Cok |
| 2018/0233536 A1 | 8/2018 | Chang |
| 2018/0247586 A1 | 8/2018 | Vahid Far et al. |
| 2018/0275410 A1 | 9/2018 | Yeoh et al. |
| 2018/0301433 A1 | 10/2018 | Robin et al. |
| 2018/0308832 A1 | 10/2018 | Shin et al. |
| 2018/0323116 A1 | 11/2018 | Wu et al. |
| 2018/0323178 A1 | 11/2018 | Meitl et al. |
| 2018/0331258 A1 | 11/2018 | Halbritter et al. |
| 2018/0342492 A1 | 11/2018 | Lu |
| 2018/0358339 A1 | 12/2018 | Iguchi |
| 2018/0358340 A1 | 12/2018 | Wong et al. |
| 2018/0367769 A1 | 12/2018 | Greenberg |
| 2019/0012957 A1 | 1/2019 | Liu et al. |
| 2019/0012965 A1 | 1/2019 | Fu et al. |
| 2019/0013439 A1 | 1/2019 | Sung et al. |
| 2019/0044023 A1 | 2/2019 | Cheng et al. |
| 2019/0058081 A1 | 2/2019 | Ahmed et al. |
| 2019/0066571 A1 | 2/2019 | Goward |
| 2019/0066587 A1 | 2/2019 | Han |
| 2019/0113199 A1 | 4/2019 | Pellarin et al. |
| 2019/0113727 A1 | 4/2019 | Tamma |
| 2019/0115508 A1 | 4/2019 | Lin et al. |
| 2019/0137757 A1 | 5/2019 | Rousseau |
| 2019/0148606 A1 | 5/2019 | Racz et al. |
| 2019/0165209 A1* | 5/2019 | Bonar .................. H10H 20/814 |
| 2019/0174079 A1 | 6/2019 | Anthony et al. |
| 2019/0195466 A1 | 6/2019 | Shimizu |
| 2019/0198716 A1 | 6/2019 | Gordon et al. |
| 2019/0229097 A1 | 7/2019 | Takeya et al. |
| 2019/0235234 A1 | 8/2019 | Hu et al. |
| 2019/0235677 A1 | 8/2019 | Liu et al. |
| 2019/0258346 A1 | 8/2019 | Cheng et al. |
| 2019/0273471 A1 | 9/2019 | Ahmed et al. |
| 2019/0293939 A1 | 9/2019 | Sluka |
| 2019/0302917 A1 | 10/2019 | Pan |
| 2019/0305035 A1 | 10/2019 | Cho et al. |
| 2019/0305036 A1 | 10/2019 | Ahn et al. |
| 2019/0305185 A1 | 10/2019 | Lauermann et al. |
| 2019/0335553 A1 | 10/2019 | Ahmed et al. |
| 2019/0347979 A1 | 11/2019 | Ahmed |
| 2019/0371777 A1 | 12/2019 | Iguchi |
| 2019/0378674 A1 | 12/2019 | Chou et al. |
| 2019/0383474 A1 | 12/2019 | Vasylyev |
| 2019/0393198 A1 | 12/2019 | Takeya |
| 2020/0052033 A1 | 2/2020 | Iguchi |
| 2020/0105184 A1 | 4/2020 | Shao et al. |
| 2020/0119233 A1 | 4/2020 | Dupont |
| 2020/0134624 A1 | 4/2020 | Zhang et al. |
| 2020/0203580 A1 | 6/2020 | Marutani |
| 2020/0219855 A1 | 7/2020 | Chen et al. |
| 2020/0227594 A1 | 7/2020 | Kuo |
| 2020/0251638 A1 | 8/2020 | Morris et al. |
| 2020/0342194 A1 | 10/2020 | Bhat et al. |
| 2020/0343230 A1 | 10/2020 | Sizov et al. |
| 2020/0356016 A1 | 11/2020 | Sampayan et al. |
| 2020/0357103 A1 | 11/2020 | Wippermann et al. |
| 2020/0366067 A1 | 11/2020 | David et al. |
| 2021/0005775 A1 | 1/2021 | Chen et al. |
| 2021/0005782 A1 | 1/2021 | Ting et al. |
| 2021/0043617 A1 | 2/2021 | Onuma et al. |
| 2021/0104574 A1 | 4/2021 | Behringer et al. |
| 2021/0104647 A1 | 4/2021 | Harrold et al. |
| 2021/0124247 A1 | 4/2021 | Mezouari et al. |
| 2021/0134624 A1 | 5/2021 | Zhang |
| 2021/0136966 A1 | 5/2021 | Jang et al. |
| 2021/0242370 A1 | 8/2021 | Lee et al. |
| 2021/0272938 A1 | 9/2021 | Chang et al. |
| 2021/0313497 A1 | 10/2021 | Pourquier |
| 2021/0325594 A1 | 10/2021 | Meng et al. |
| 2021/0375833 A1 | 12/2021 | Lee et al. |
| 2021/0391514 A1 | 12/2021 | Koyama et al. |
| 2021/0405276 A1 | 12/2021 | Brick et al. |
| 2022/0051614 A1 | 2/2022 | Baumheinrich et al. |
| 2022/0052235 A1 | 2/2022 | Biebersdorf et al. |
| 2022/0093833 A1 | 3/2022 | Takiguchi et al. |
| 2022/0101781 A1 | 3/2022 | Baumheinrich et al. |
| 2022/0102583 A1 | 3/2022 | Baumheinrich et al. |
| 2022/0123046 A1 | 4/2022 | Behringer et al. |
| 2022/0231193 A1 | 7/2022 | Boss et al. |
| 2022/0262850 A1 | 8/2022 | Behringer et al. |
| 2022/0262851 A1 | 8/2022 | Behringer et al. |
| 2022/0262852 A1 | 8/2022 | Behringer et al. |
| 2022/0271084 A1 | 8/2022 | Behringer et al. |
| 2022/0271085 A1 | 8/2022 | Behringer et al. |
| 2022/0285430 A1 | 9/2022 | Behringer et al. |
| 2022/0285591 A1 | 9/2022 | Biebersdorf et al. |
| 2022/0285592 A1 | 9/2022 | Biebersdorf et al. |
| 2022/0293829 A1 | 9/2022 | Biebersdorf et al. |
| 2022/0293830 A1 | 9/2022 | Biebersdorf et al. |
| 2022/0310888 A1 | 9/2022 | Biebersdorf et al. |
| 2022/0352436 A1 | 11/2022 | Biebersdorf et al. |
| 2022/0375991 A1 | 11/2022 | Behringer et al. |

FOREIGN PATENT DOCUMENTS

| | | |
|---|---|---|
| DE | 19911717 A1 | 9/2000 |
| DE | 10009782 A1 | 9/2001 |

(56) References Cited

FOREIGN PATENT DOCUMENTS

| DE | 102006045702 A1 | 4/2008 |
|----|----|----|
| DE | 102007043877 A1 | 1/2009 |
| DE | 102007046339 A1 | 4/2009 |
| DE | 102005063159 B4 | 5/2009 |
| DE | 102012008833 A1 | 11/2012 |
| DE | 102013104273 A1 | 10/2014 |
| DE | 102017106755 A1 | 10/2018 |
| DE | 102017109083 A1 | 10/2018 |
| DE | 102018108022 A1 | 10/2018 |
| DE | 102017114369 A1 | 1/2019 |
| DE | 102018113363 A1 | 12/2019 |
| DE | 102018119312 A1 | 2/2020 |
| DE | 102018119376 A1 | 2/2020 |
| EP | 0488772 A1 | 6/1992 |
| EP | 1544660 A1 | 6/2005 |
| EP | 1553640 A1 | 7/2005 |
| EP | 1887634 A2 | 2/2008 |
| EP | 2323185 A2 | 5/2011 |
| EP | 2396818 A2 | 12/2011 |
| EP | 2430652 A1 | 3/2012 |
| EP | 2609624 | 3/2012 |
| EP | 2477240 A1 | 7/2012 |
| EP | 2506321 A1 | 10/2012 |
| EP | 2642537 A2 | 9/2013 |
| EP | 2685155 A2 | 1/2014 |
| EP | 2750208 A2 | 7/2014 |
| EP | 2838130 A1 | 2/2015 |
| EP | 2924490 A2 | 9/2015 |
| EP | 2980866 A1 | 2/2016 |
| EP | 2986082 A1 | 2/2016 |
| EP | 3010048 A1 | 4/2016 |
| EP | 3031086 A1 | 6/2016 |
| EP | 2676528 B1 | 8/2017 |
| EP | 3226042 A1 | 10/2017 |
| EP | 2704215 B1 | 4/2018 |
| EP | 3367374 A1 | 8/2018 |
| JP | S642386 A | 6/1987 |
| JP | S62269385 A | 11/1987 |
| JP | 106244457 A | 9/1994 |
| JP | H11145519 A | 5/1999 |
| JP | 2002246647 A | 8/2002 |
| JP | 2004-228297 A | 8/2004 |
| JP | 2005244220 A | 9/2005 |
| JP | 2005346066 A | 12/2005 |
| JP | 2006263932 A | 10/2006 |
| JP | 2007264610 A | 10/2007 |
| JP | 2007324416 A | 12/2007 |
| JP | 2009141254 A | 6/2009 |
| JP | 2009186794 A | 8/2009 |
| JP | 2009260357 A | 11/2009 |
| JP | 2010272245 A | 12/2010 |
| JP | 2012510716 A | 5/2012 |
| JP | 2013048282 A | 3/2013 |
| JP | 2013110154 A | 6/2013 |
| JP | 2014019436 A | 2/2014 |
| JP | 2014110333 A | 6/2014 |
| JP | 2015099238 A | 5/2015 |
| JP | 2016174179 A | 9/2016 |
| JP | 2016208012 A | 12/2016 |
| JP | 2019009438 A | 1/2017 |
| JP | 2017152655 A | 8/2017 |
| JP | 2017-533453 A | 11/2017 |
| JP | 2017535966 A | 11/2017 |
| JP | 2018050082 A | 3/2018 |
| JP | 2018063975 A | 4/2018 |
| JP | 2018-191006 A | 11/2018 |
| JP | 2019029473 A | 2/2019 |
| KR | 10-0713226 B1 | 5/2007 |
| KR | 10-2011-0075279 A | 7/2011 |
| KR | 20130052944 A | 5/2013 |
| KR | 10-2014-0009923 A | 1/2014 |
| KR | 10-1798134 B1 | 11/2017 |
| WO | 2004084318 A1 | 9/2004 |
| WO | 2006035212 A1 | 4/2006 |
| WO | 2007001099 A1 | 1/2007 |
| WO | 2009082121 A2 | 7/2009 |
| WO | 2010019594 A2 | 2/2010 |
| WO | 2010132552 A1 | 11/2010 |
| WO | 2010149027 A1 | 12/2010 |
| WO | 2011069747 A1 | 6/2011 |
| WO | 2011117056 A1 | 9/2011 |
| WO | 2011160051 A2 | 12/2011 |
| WO | 2012014857 A1 | 2/2012 |
| WO | 2013026440 A2 | 2/2013 |
| WO | 2014047113 A1 | 3/2014 |
| WO | 2014093063 A1 | 6/2014 |
| WO | 2015138102 A1 | 9/2015 |
| WO | 2016025325 A1 | 2/2016 |
| WO | 2016054092 A1 | 4/2016 |
| WO | 2016060677 A1 | 4/2016 |
| WO | 2016/151112 A1 | 9/2016 |
| WO | 2017087312 A1 | 5/2017 |
| WO | 2017111827 A1 | 6/2017 |
| WO | 2017120320 A1 | 7/2017 |
| WO | 2017120341 A1 | 7/2017 |
| WO | 2017197576 A1 | 11/2017 |
| WO | 2018117382 A1 | 6/2018 |
| WO | 2018123280 A1 | 7/2018 |
| WO | 2018/192322 A1 | 10/2018 |
| WO | 2018179540 A1 | 10/2018 |
| WO | 2019079383 A1 | 4/2019 |

OTHER PUBLICATIONS

David. Photonic crystal light-emitting sources. Reports on Progress in Physics, 2012 (Year: 2012).*

Nagasawa. MEMS Tunable Optical Filter Using Auto-Cloned Photonic crystal, MEMS conference, 2006 (Year: 2006).*

Fehrembach, Highly directive light sources . . . Appl. Phys. Lett, 79, 4280-4282, 2001 (Year: 2001).*

Choi. Design of an LED Chip Structure with Integrated Two-dimensional Photonic Crystal, Journal of Korean Phys. Soc. vol. 64, No. 10, 2014 (Year: 2014).*

Buljan et al., "Ultra-Compact Multichannel Freeform Optics for 4xWUXGA OLED Microdisplays," Proc. SPIE 10676, Digital Optics for Immersive Displays, 9 pages (2018).

Fortuna, "Integrated Nanoscale Antenna-LED for On-Chip Optical Communication," UC Berkeley, 146 pages (2017).

Li et al., "Waveguiding in Vertical Cavity Quantum-Well Structure Defined by Ion Implantation," J. Lightwave Technol. 16, pp. 1498-1508 (1998).

Ogihara et al., "1200 Dots-Per-Inch Light Emitting Diode Array Fabricated by Solid-Phase Zinc Diffusion," IEICE Transactions on Electronics, 80;3, pp. 489-497 (1997).

Stevens et al., "Varifocal Technologies Providing Prescription and VAC Mitigation In HMDs Using Alvarez Lenses," Proc. SPIE 10676, Digital Optics for Immersive Displays, 18 pages (2018).

Tomioka et al., "Selective-Area Growth of III-V Nanowires and Their Applications," Journal of Materials Research, 26(17), pp. 2127-2141 (2011).

Waldern et al., "DigiLens Switchable Bragg Grating Waveguide Optics for Augmented Reality Applications," Proc. SPIE 10676, Digital Optics for Immersive Displays, 17 pages (2018).

Wheelwright et al., "Field of View: Not Just A Number," Proc. SPIE 10676, Digital Optics for Immersive Displays, 8 pages (2018).

Yu et al., "Hybrid LED Driver for Multi-Channel Output with High Consistency," 2015 IEEE 11th International Conference on ASIC (ASICON), Chengdu, 4 pages (2015).

Huang et al., "Metasurface holography: from fundamentals to applications," Nanophotonics. 7(6), pp. 1169-1190 (2018).

Notice of Allowance in U.S. Appl. No. 17/474,975, mailed Jul. 27, 2022, 11 pages.

Volz et al., "Influence of annealing on the optical and structural properties of dilute N-containing III/V semiconductor heterostructures," Journal of Crystal Growth, Jan. 2007, vol. 298, pp. 126-130.

Ron Mertens, "More details emerge on Samsung's QD-OLED TV Plans", available online at <https://www.oled-info.com/more-details-emerge-samsungs-qd-oled-tv-plans>, Dec. 8, 2018, 4 pages.

(56)                         References Cited

OTHER PUBLICATIONS

Mingzeng Peng, Yan Zhang, Yudong Liu, Ming Song, Junyi Zhai, Zhong Lin Wang, "Magnetic-Mechanical-Electrical-Optical Coupling Effects in GaN-Based LED/Rare-Earth Terfenol-D Structures," vol. 26, Issue 39, Oct. 22, 2014, pp. 6767-6772.

* cited by examiner a)

b)

a)

b)

1

ILLUMINATION UNIT, METHOD FOR PRODUCING AN ILLUMINATION UNIT, CONVERTER ELEMENT FOR AN OPTOELECTRONIC COMPONENT, RADIATION SOURCE INCLUDING AN LED AND A CONVERTER ELEMENT, OUTCOUPLING STRUCTURE, AND OPTOELECTRONIC DEVICE

This patent application is a U.S.C. 371 National Stage entry of PCT Application No. PCT/EP2020/063405 filed May 14, 2020, which claims the priority of German patent application No. DE 10 2019 112 639.8 dated May 14, 2019, the priority of German application DE 10 2019 112 616.9 dated May 14, 2019, the priority of German application DE 10 2019 115 991.1 dated 12, Jun. 2019, the priority of German application DE 10 2019 116 313.7 dated Jun. 14, 2019, the priority of German application DE 10 2019 118 251.4 dated Jul. 5, 2019, and the priority of international application PCT/EP2020/052191 dated Jan. 29, 2020, the disclosures of which are hereby incorporated by reference.

The invention relates to an illumination unit with at least one optoelectronic emitter unit.

The invention also relates to an illumination unit having at least one emitter unit which emits radiation via a light-emitting surface, and having a polarization element which is connected at least in sections to the light-emitting surface and changes a polarization and/or an intensity of radiation emanating from the emitter unit when the radiation passes through the polarization element.

The invention also relates to a converter element for an optoelectronic device, a radiation source comprising an LED and a converter element, and a method of manufacturing a corresponding radiation source.

The invention also relates to a device, in particular an optoelectronic component, in particular a light-emitting diode.

The present invention relates to an optoelectronic device in which an array comprising a plurality of light sources is provided for generating light. Such arrangements may be, for example, pixelated arrays of LEDs in which, for example, one pixel at a time forms a light source.

The light emitter of an optoelectronic emitter unit is in particular an LED (LED=light emitting diode). LEDs are normally Lambertian emitters. The light emitted by a light-emitting surface is not directional. The light is therefore normally emitted in the entire solid angle range adjacent to the light-emitting surface.

For many applications, it would be desirable to have an illumination unit with an optoelectronic emitter unit that has a desired radiation pattern. For very small components, such as in high-resolution displays or in components for consumer electronics applications, it is desirable to have illumination units that allow directional radiation into a specific solid angle and suppress radiation into other solid angles as far as possible.

Technical solutions for beam shaping of electromagnetic radiation which has already emerged from the light emission surface of an illumination unit are known from the prior art. For example, optics, in particular lenses, are used by means of which electromagnetic radiation propagating freely in space can be collimated. Such illumination units with optics arranged downstream of a light-emitting surface can be relatively large. This can be undesirable.

The present invention is based on the task of providing an illumination unit which, in particular in comparison with a Lambertian radiator, has an improved radiation characteristic.

An illumination unit according to the invention comprises at least one optoelectronic emitter unit, which emits electromagnetic radiation via a light-emitting surface, and a photonic structure for beam-shaping the electromagnetic radiation before it emerges via the light-emitting surface, the photonic structure shaping the electromagnetic radiation in such a way that the electromagnetic radiation comprises a certain far field.

The photonic structure thus changes the radiation characteristic of the illumination unit from a Lambertian radiator to a defined radiation characteristic in the far field. The formulation that the electromagnetic radiation comprises a specific far field thus means in particular that the radiation characteristic in the far field is defined and differs from the radiation characteristic of a Lambertian radiator. By far field is meant an area which, depending on the application, is at least a few centimeters or even a few meters away from the illumination unit.

The photonic structure can be arranged, in particular in a layer, below the light-emitting surface and/or between the optoelectronic emitter unit and the light-emitting surface. The photonic structure can thus be integrated into the illumination unit, allowing it to be formed compactly. The photonic structure may also be integrated into the light emitting surface, or an end face of the photonic structure may form the light emitting surface.

The optoelectronic emitter unit may comprise at least one LED. The optoelectronic emitter unit may also comprise an array, also referred to as an array, of LEDs.

The photonic structure can be a photonic crystal, a quasiperiodic or deterministic aperiodic photonic structure. A photonic crystal refers to periodic structures that produce a band structure for photons by a periodic variation of the optical refractive index. This band structure may have a band gap in a certain frequency range. This property can alternatively be generated with non-periodic but nevertheless ordered structures. Such structures are in particular quasiperiodic structures or deterministic aperiodic structures. These can be, for example, spiral photonic arrays.

The photonic structure may be a one-dimensional photonic structure, in particular a one-dimensional photonic crystal. A one-dimensional photonic crystal exhibits a periodic variation of the refractive index along a direction. In particular, this direction can be parallel to the light emission plane.

Due to the one-dimensional structure, beam shaping can take place in a first spatial direction. Thereby, a photonic effect can already be achieved at a few periods in the photonic structure. The photonic structure can, for example, be designed in such a way that the electromagnetic radiation is at least approximately collimated with respect to the first spatial direction. Thus, a collimated beam can be generated at least with respect to the first spatial direction.

A collimating optical system can be arranged downstream of the light-emitting surface, as seen in the direction of emission, the optical system being designed to collimate the electromagnetic radiation in a further, second spatial direction which runs orthogonally to the first spatial direction. The first direction and the second direction may be mutually orthogonal directions that are parallel to the planar light emitting surface. Thus, a collimated beam can be generated in both directions that is directed along the main radiation direction that is directed away from the light emitting surface and is orthogonal to both the first and second directions.

According to one embodiment of the invention, the photonic structure, in particular formed as a one-dimensional photonic crystal, can be designed in such a way that a main radiation direction of the electromagnetic radiation runs at an angle to the normal of the light-emitting surface, the angle not being equal to zero degrees. The main radiation direction can thus run inclined to the normal of the light-emitting surface. A beam collimated in at least one direction can thus emerge from the light-emitting surface at an angle, for example.

The photonic structure formed as a one-dimensional photonic crystal can be arranged in a layer below, in particular directly below, the light-emitting surface. The one-dimensional photonic crystal can have a periodically repeating sequence of two materials with different optical refractive indices extending in one direction. The materials may each have a rectangular or parallelogram cross-section. The abutting interfaces of the materials can be inclined to the light-emitting surface.

Such a structure can be formed, for example, by etching trenches running parallel to each other at an angle to the light-emitting surface into the substrate having the light-emitting surface. The trenches can be filled with a material that has a different optical refractive index than the substrate material etched away. The angle may depend on the slope of the trenches relative to the light-emitting surface, and the width of the trenches or the width of the substrate material remaining between the trenches will affect the wavelengths at which the photonic structure is effective. Typically, the width of the trenches and the width of the substrate material remaining between the trenches are matched to the wavelength of the electromagnetic radiation.

The photonic structure may be a two-dimensional photonic structure, in particular a two-dimensional photonic crystal. One end face of the two-dimensional photonic structure may form the light-emitting surface of the illumination unit, or the two-dimensional photonic structure may be arranged in a layer below the light-emitting surface.

The two-dimensional structure, in particular a two-dimensional photonic crystal, can be designed in such a way that it influences the electromagnetic radiation in such a way that the electromagnetic radiation forms a defined, in particular a discrete, pattern in the far field. The illumination unit can thus be used in surface topography systems, for example, for face recognition.

As mentioned, the photonic structure may be disposed in a layer below the light emitting surface, or an end face of the photonic structure may form the light emitting surface so that the photonic structure is directly below and encompasses the light emitting surface.

The photonic structure may also be formed in a semiconductor layer of the optoelectronic emitter unit.

The optoelectronic emitter unit may include a layer of converter material, and the photonic structure may be formed in the layer of converter material or in a layer between the layer of converter material and the light emitting surface.

The optoelectronic emitter unit can have at least one optoelectronic laser, such as a VCSEL (vertical-cavity surface-emitting laser). An array of several lasers is also conceivable.

The invention also relates to a surface topography detection system, with an illumination unit comprising:

at least one optoelectronic emitter unit which emits electromagnetic radiation via a light-emitting surface, and a photonic structure for beam-shaping the electromagnetic radiation before it emerges via the light-emitting surface, the photonic structure shaping the electromagnetic radiation in such a way that the electromagnetic radiation has a defined far field, wherein the photonic structure is a two-dimensional photonic structure, in particular a two-dimensional photonic crystal, and wherein the two-dimensional photonic structure is configured in such a way that the electromagnetic radiation generates a defined, in particular a discrete, pattern in the far field, and wherein the surface topography detection system further comprises a detection unit, in particular comprising a camera, which is designed to detect the pattern in the far field.

The surface topography detection system may include analysis means adapted to determine a distortion of the pattern with respect to a predetermined reference pattern.

The analysis device may be configured to determine a shape and/or a structure of an object illuminated by the pattern as a function of the determined distortion.

The invention also relates to a scanner for scanning an object, wherein the scanner comprises at least one illumination device according to the invention, which can preferably be used for line-by-line detection of the object.

It can also be regarded as a task to further design an illumination unit in such a way that a polarization and/or a change in the intensity of the radiation emitted by at least one emitter, in particular of visible light, is made possible by relatively simple means. It may be essential here that a corresponding illumination unit is designed to be as space-saving and energy-efficient as possible, whereby in particular the need for the use of additional optical elements is to be reduced.

It may also be desirable to provide a simple, safe and robust illumination unit for the emission of on-demand polarized electromagnetic radiation, which can also be combined with other illumination units without major problems. Furthermore, it should be possible to manufacture the illumination unit on an industrial scale and preferably using already known manufacturing processes. It would thus be desirable to find a technical solution that is particularly space-saving in design, enables energy-efficient operation with high luminous efficacy, and can be manufactured within an economically reasonable framework.

Preferred embodiments of an illumination device according to the invention therefore concerned an illumination unit with at least one emitter unit, which emits radiation via a light emission surface, and with a polarization element, which adjoins the light emission surface at least in sections and changes a polarization and/or an intensity of the radiation emitted by the emitter unit when the radiation passes through the polarization element. The illumination unit is characterized in that the polarization element has a three-dimensional photonic structure.

The formulation that the polarization element changes a polarization also includes the generation of polarized radiation from non-polarized radiation. The polarization element can also only cause a change in the intensity of the radiation, which may be wavelength-dependent, without generating or changing a polarization. The term "polarization element" is thus not to be interpreted narrowly, in the sense that a change or generation of a polarization must be provided in all embodiments.

Due to the embodiment according to the invention, an illumination unit is provided in which the radiation generated by the emitter, for example an LED, directly enters the polarization element, so that a particularly compact unit for providing polarized radiation as required is realized, which in turn can be combined in an advantageous manner with at least one further illumination unit and/or a polarization element, preferably with at least one polarization element having complementary properties.

The essential advantage of using a three-dimensional photonic structure, in particular a photonic crystal, for an illumination unit for polarization of an electromagnetic radiation, whereby preferably visible light is polarized, is that a particularly compact, space-saving solution is provided by arranging the photonic structure in the area of the light emission surface of the emitter. With the help of the specially designed polarization element adjacent to the light-emitting surface, it is possible to selectively polarize electromagnetic radiation and still minimize the losses of radiation whose polarization does not correspond to the polarization direction of the polarization element. In general, it is conceivable that the photonic structure is arranged on the light-emitting surface, or that a photonic structure is suitably formed in a semiconductor layer on which the light-emitting surface is located or to which the light-emitting surface adjoins in the beam direction.

Here it is of particular advantage that with the three-dimensional structures used as polarization elements, the radiation characteristics of an illumination unit can be changed in a particularly effective manner with regard to their polarization properties and thus discrimination of different wavelengths can be achieved through different polarization properties or radiation directions.

According to one embodiment of the invention, the emitter unit comprises at least one LED. In this context, it is conceivable that the LED preferably emits white, red, green or blue light, which is irradiated into the polarization element and by means of the polarization element the radiation is polarized in a direction of oscillation.

Moreover, according to a further development of the invention, it is provided that the emitter unit, in particular an LED, as well as the polarization element are formed from different layers which are arranged one above the other in a layer stack. In turn, it is essential that the radiation generated in at least one layer of the emitter enters the polarization element, which is also in the form of layers, before the radiation is emitted from the layer stack into the environment. In an advantageous manner, it is conceivable in this context that the three-dimensional structure used as polarization element is located on or in the same semiconductor chip as the emitter unit. When using an emitter unit with LED, it is further conceivable that the photonic structure is applied to the LED chip or is at least part of the LED chip. With such an embodiment of the invention, a particularly space-saving and energy-efficient lighting unit is provided, with which polarized radiation is already generated directly at the chip level, without additional optical elements having to be arranged in the downstream beam path for this purpose. Such a technical solution thus represents a cost-effective as well as space-saving and energy-efficient technical solution for the provision of polarized radiation.

In a further embodiment of the invention, the polarization element has spiral and/or rod-shaped structural elements. In this case, the three-dimensional photonic structure is designed in such a way that light emitted by the emitter unit, in particular an LED, only emerges from the photonic structure with a specific polarization. A corresponding three-dimensional photonic structure with spiral and/or rod-shaped structural elements in the area of the light emitter surface is only penetrated by radiation with a specific polarization direction. Preferably, the design and dimensioning of the structure is matched to the radiation emitted in each case by the emitter unit, in particular an LED. With a spiral-shaped structure, a circular polarization is achieved, while a rod-shaped structure causes a linear polarization of the radiation passing through the structure.

According to a further development, it is further conceivable that the illumination unit has an LED as emitter unit and the radiation emitted by the LED impinges as excitation radiation on a converter element with converter material, which causes the emission of converted radiation. In this case, it is generally conceivable that a three-dimensional photonic structure is arranged in the beam path between the LED and the converter element and/or behind the converter element, through which the excitation radiation and/or the converted radiation is polarized in a suitable manner. The combination of converter element and three-dimensional photonic structure in the same layer is also feasible. Thus, directly polarized converted light can be generated.

For example, converter material can be filled into the three-dimensional photonic structure. The converter material can be doped with Ce3+ (Ce for cerium), Eu2+ (Eu for europium), Mn4+ (Mn for manganese) or neodymium ions. For example, YAG or LuAG can be used as host material. YAG stands for yttrium aluminum garnet. LuAG stands for lutetium aluminum garnet.

Quantum dots can also be filled into the three-dimensional photonic structure as converter material.

Quantum dots can be very small, for example in the range of 10 nm. They are therefore particularly suitable for filling the three-dimensional photonic structure. In general, it is conceivable that the structure is created by etching out material from the layer in which the structure is to be formed. The recesses thus formed can then be filled with converter material containing, for example, quantum dots. The quantum dots may, for example, be introduced into a liquid material with which the recesses are filled. The liquid material may be at least partially evaporated, leaving the quantum dots in the recesses. In the process, some of the liquid material may solidify. The quantum dots may therefore be embedded in a matrix.

In a further embodiment of the invention, the polarization element comprises at least one three-dimensional photonic crystal. Likewise, it is conceivable that the polarization element comprises at least two two-dimensional photonic crystals arranged in series along a beam path of the radiation passing through the polarization element.

Preferably, a three-dimensional photonic crystal or at least two two-dimensional photonic crystals arranged one behind the other in the beam path is used so that the structure on which the radiation impinges is transparent to radiation of a specific wavelength or several specific wavelengths and/or transmits them only in a specific direction. In this way, the desired polarization of the radiation impinging on the polarizing element can also be adjusted. In this context, it is conceivable to produce the structure directly in the converter material or to incorporate it in an additional layer of another material. The property of the three-dimensional photonic structure is thereby preferably designed in such a way that the transmission conditions are different for different wavelengths. In this way, it is possible that, for example, converted radiation can pass through the polarization element unhindered, while the excitation radiation is deflected. Likewise, it is conceivable that at least one of the radiations, namely excitation radiation on the one hand and converted radiation on the other, passes through the polarization element only with a certain polarization.

In one embodiment of the invention, it is further provided that the polarizing element has at least two different transmittances depending on a wavelength of radiation passing through the polarizing element. In this regard, a specific further embodiment provides that the emitter unit comprises an LED and a converter element comprising a converter material which, excited by excitation radiation emitted by the LED, emits converted radiation, and that excitation radiation incident on the polarization element is polarized differently and/or absorbed to a different extent when passing through the polarization element compared to converted radiation passing through.

The properties of the three-dimensional photonic structure are thus such that the transmission conditions are different for different wavelengths. In this case, it is conceivable that converted light can pass through the three-dimensional photonic structure unhindered, while the excitation radiation is deflected. Likewise, it is conceivable that converted radiation exits the three-dimensional photonic structure only with a certain polarization.

Furthermore, it is conceivable that one of the two radiations comprising different wavelengths is discriminated by the different properties of the polarization element with respect to polarization and propagation direction. Preferably, therefore, it is provided that in a combination of an LED and a converter element by which a full conversion is realized, a part of the excitation radiation is filtered out except for a comparatively small portion of radiation with a special wavelength, which results in the fact that a thinner layer of the converter material can be used.

In a particularly advantageous way, the advantages of the invention can be used provided that an emitter unit with an LED is provided and the three-dimensional structure of the polarization element is applied directly to the LED chip, preferably to the semiconductor layer of the LED via which the generated radiation reaches the light emission surface. According to this embodiment, the three-dimensional photonic structure is located directly on or in the LED chip. With such a technical solution, the resolution in the generation of images can be improved due to the polarized radiation emission, and components for beam generation can be made comparatively small. This can be achieved, for example, by imaging the radiation emitted by several components or several illumination units with complementary properties via common optics. Illumination units designed in this way can thus be used in particular in the field of consumer electronics.

In addition, the invention relates to a method for producing an illumination unit having at least one emitter unit which emits radiation via a light-emitting surface, and having a polarization element which adjoins the light-emitting surface at least in sections and changes a polarization and/or an intensity of radiation emanating from the emitter unit when the radiation passes through the polarization element.

According to the invention, the method has been further illustrated by providing as emitter unit a chip with an LED, on the light emission surface of which a three-dimensional photonic structure is applied as polarization element, for example by way of two-photon lithography or glancing angle deposition, and/or the photonic structure is introduced into a semiconductor layer of the LED adjoining the light emission surface.

According to a special further development of the method, it is provided that the three-dimensional structure is dimensioned as a function of the wavelength of the radiation emitted by the LED.

Advantageously, an illumination unit embodied according to at least one of the embodiments based on the invention can be used in a device for generating three-dimensional images, in particular for display on a display, a monitor or a screen.

In a particularly advantageous way, an illumination unit according to the invention can also be used for computer-aided generation of three-dimensional images. It is advantageous here that the illumination unit according to the invention with a three-dimensional photonic structure as polarization element changes the radiation characteristics of LEDs with respect to the polarization properties and thus discrimination of different wavelengths can be achieved due to different, wavelength-specific polarization properties or radiation directions.

It is of great advantage here that polarized radiation, in particular polarized light, can be generated directly on a substrate with an emitter unit, in particular at the level of an LED chip, or the selectivity can be improved with full conversion. Due to the emission of selectively polarized radiation, the resolution of three-dimensional images can be improved and, at the same time, the components or illumination units required for image generation can be reduced in size. This can be achieved in an advantageous way by imaging the light of several components with complementary properties via common optics on a display or screen. In the field of consumer electronics in particular, three-dimensional images can be generated with particular preference by combining complementary polarization elements.

It may also be desirable to further design a converter element for an optoelectronic component as well as a radiation source with such a converter element in such a way that a particularly space-saving arrangement of the individual elements and thus a particularly small design of a radiation source, consisting of an emitter for emitting excitation radiation and a converter element, is made possible. Here, it may be of great importance that the radiation emitted by the radiation source is selectively radiated into a specific area of space, while radiation into other areas is reliably prevented in a comparatively simple manner. Furthermore, a technical solution may be desirable that is characterized by a high energy efficiency and thus by a comparatively good light yield compared to known technical solutions.

Furthermore, it may be desirable that a radiation source comprising an emitter for generating an excitation radiation and a converter element for generating a converted radiation can be realized in a manufacturing manner that is simple and inexpensive and, in particular, with known manufacturing methods. In this respect, it may be desirable to disclose a method for manufacturing a radiation source.

The invention also relates to a converter element for an optoelectronic component which has at least one layer with a converter material which, when excited by an incident excitation radiation, emits a converted radiation into a radiation region. According to the invention, the converter element is characterized in that the layer comprises, at least in regions, a structure on which the converter material is arranged, at least in sections, and which is designed in such a way that the radiation is emitted as a directed beam into the radiation region. An essential feature of the invention is thus the provision of a layer which is structured in a suitable manner, wherein a converter material which emits converted radiation when excited by an excitation or pump radiation is applied in or on the structure. By combining the components converter material on the one hand and structured layer for targeted beam guidance and/or shaping on the other hand, an element is created in a particularly space-saving manner which enables targeted emission of radiation into the radiation area of the radiation source, limited to a desired spatial area. In this context, it is conceivable both that the converted radiation emitted by the converter element and the excitation radiation are directed in a suitable manner so that radiation is emitted only in a specific direction, while the emission of such radiation in other directions and/or areas is excluded.

In general, it is conceivable that the structure, which is also referred to herein as a photonic structure, is coated at least in areas with a suitable converter material and/or at least individual areas, for example recesses of the structure, are filled with the suitable converter material. In this case, the structure is designed in such a way that the emitted converted radiation is emitted as a beam in a desired direction of the radiation area. In this context, it is conceivable to design the structure in a suitable manner such that different areas are present into which a beam of radiation is emitted. In this way, converter elements can be provided which adjust the radiation characteristics of an optoelectronic component in which they are used as required. In particular, due to a suitable structuring of the layer, it is possible to provide a converter element by means of which the emission profile of an optoelectronic component, for which the converter element is used, can be changed in such a way that the radiation no longer takes place according to Lambert's law, but a beam or a beam bundle is generated which is directed specifically in one direction.

The converter material can be doped with Ce3+ (Ce for cerium), Eu2+ (Eu for europium), Mn4+ (Mn for manganese) or neodymium ions. For example, YAG or LuAG can be used as host material. YAG stands for yttrium aluminum garnet. LuAG stands for lutetium aluminum garnet.

Quantum dots can also be used as converter material. These are very small, for example in the range of 10 nm. They are therefore particularly suitable for filling the aforementioned depressions in the photonic structure. In general, it is conceivable that the photonic structure is produced by etching out depressions from the layer in which the photonic structure is to be formed. The depressions can then be filled with converter material containing, for example, quantum dots. The quantum dots may, for example, be introduced into a liquid material with which the wells are filled. The liquid material may be at least partially evaporated, leaving the quantum dots in the wells. In the process, some of the liquid material may solidify. The quantum dots may therefore be embedded in a matrix.

The photonic structure does not normally change the spectral properties of a quantum dot. However, a quantum dot has a narrow-band emission spectrum. The photonic structure can be adapted to this narrow-band emission spectrum, which can improve the directional selectivity provided by the photonic structure. By means of a photonic structure, the radiation characteristics of quantum dots as converters can thus be influenced very efficiently.

In one embodiment of the invention, it is provided that the structure comprises quasiperiodically or deterministically aperiodically arranged structural elements. Such a regular structure offers the advantage that the optical properties of the converter element with a corresponding structured layer can be adjusted in a particularly reliable, safe and reproducible manner. In this case, the structure is advantageously designed in such a way that radiation of a specific wavelength or a specific wavelength range can penetrate the layer in a specifically predetermined direction, while this radiation cannot penetrate the layer in other directions. Alternatively or additionally, the structured layer can be designed in such a way that it is transparent or non-transmissive for radiation of a specific wavelength at least over a large range.

According to a further development of the invention, it is provided that the layer comprises at least one photonic crystal. By using a suitable photonic crystal, the propagation of radiation of selected wavelengths or wavelength ranges, at least their propagation in a certain direction, can be blocked in a targeted manner and thus a beam or a bundle of beams of the converted radiation can be emitted in a directed manner as required in the spatial region or radiation region provided for this purpose. Deterministic aperiodic structures and quasiperiodic structures can comprise the same functionality as photonic crystals. However, slightly different properties may be present in the far field. If photonic crystals are mentioned herein, this shall also apply to deterministic aperiodic structures and/or quasi-periodic structures.

A photonic crystal is a periodic structure that produces a band structure for photons by a periodic variation of the optical refractive index. This band structure can have a band gap in a certain frequency range. This property can alternatively be generated with non-periodic but nevertheless ordered structures. Such structures are in particular quasiperiodic or deterministic aperiodic photonic structures. These can be, for example, spiral arrangements.

Furthermore, it is advantageous if the structure comprises at least one depression in which the converter material is located. Preferably, in this connection, it is provided that the structure comprises a plurality of elevations and depressions, the depressions being at least partially filled with the suitable converter material. In this way, it is comparatively easy to realize a converter element in which the structure provided according to the invention is combined with the converter material in such a way that the converted radiation is emitted only into a specifically limited radiation area and thus in a particularly targeted manner. In principle, it is conceivable in this context that the converter element is designed in such a way that the excitation radiation is directed by the structure specifically to areas of the converter material provided for this purpose and/or that the converted radiation impinges on the structure and is thus radiated as a specifically radiated beam into the desired radiation area.

In an advantageous manner, the layer with the structure is designed in such a way that the layer has at least one optical band gap. In this context, the band gap is understood to be the region of the layer comprising a solid-state material that lies between the valence band and the conduction band. Due to the band gap, the solid body used for the layer and thus the converter element provided with the layer are transparent to radiation in a certain frequency range. By selective adjustment of the band gap and/or selection of a solid material, the optical property of the converter element can thus be selectively adjusted. In particular, it is possible to design the layer in such a way that only part of the incident radiation is guided through the layer and emitted into the radiation range. It is of great advantage if the structure of the layer has an average thickness of at least 500 nm. In an advantageous manner, a photonic structure, in particular a photonic crystal, a quasiperiodic structure or a deterministically aperiodic structure, is selected here, which comprises a layer thickness of at least 500 nm, so that an optical band gap is generated thereby.

According to a further embodiment of the invention, it is provided that the layer with the structure is designed such that the directed beam of radiation is emitted perpendicular to a plane in which the layer is arranged. According to this embodiment, it is provided that the radiation emitted into the radiation area is arranged perpendicular to the plane of the layer. In contrast, radiation components emitted into other spatial areas are reliably suppressed.

Furthermore, it is an advantageous further development of the invention if an optical filter element is arranged on at least one side of the layer. Preferably, such a filter element is designed as a filter layer which is applied over the surface of the structured layer with the converter material. With the aid of such a filter element or such a filter layer, it is possible that only a certain part of a radiation impinges on the layer with the converter material or only a certain part of the converted radiation emitted by the structured layer with the converter material is emitted into the desired spatial region.

The filter element, in particular the filter layer, is thus preferably designed in such a way that only that portion of radiation can pass through the filter element or the filter layer which is required as excitation radiation or which is to be specifically emitted into the radiation area.

Further, the invention relates to a radiation source comprising an LED that radiates an excitation radiation into a converter element formed according to at least one of the previously described embodiments of a converter element according to the invention. The converter element in turn has at least one layer comprising a converter material which, when excited by the excitation radiation emitted by the LED, is excited to emit a converted radiation into a radiation region. In this context, it is conceivable that an LED is combined with a converter element in such a way that the entire excitation radiation emitted by the LED is converted into converted radiation or that only a portion of the excitation radiation emitted by the LED is converted into converted radiation. It is again essential that the radiation emitted into the radiation source's emission area is directed only into a desired region of space. The radiation source thus generates a directed beam or a directed beam bundle that is emitted in a specifically selected direction or in a specifically selected radiation area.

According to a further development of the invention, the structured layer with the converter material is part of a semiconductor substrate of the LED. Advantageously, the structure is formed in a semiconductor substrate of the LED. In this context, it is further preferably conceivable that the structure is produced by targeted etching of the LED semiconductor substrate and the structure is then at least partially coated with converter material and/or the converter material is filled into etched-out recesses of the structure.

Furthermore, it is advantageously provided that the structure with the converter material is designed in such a way that the converted radiation is emitted into the radiation area perpendicular to a plane in which the semiconductor substrate is arranged. The structure is designed in such a way that converted radiation is emitted into the radiation area only perpendicular to the surface of the LED chip due to a band gap effect. Due to this technical solution, a high directionality of the converted radiation emitted by the converter element is achieved. In this context, it is conceivable that the structure, in particular the photonic structure, for example in the form of a photonic crystal, is arranged only in the uppermost layer of the semiconductor material of the LED or also at least partially in the active zone. It is again advantageous if the structure has a layer thickness of at least 500 nm in order to reliably generate an optical band gap.

In a special embodiment, it is provided that at least one filter layer is provided, which is arranged at least on one side of the structured layer. In this context, it is again conceivable that the excitation radiation generated by the LED is suppressed in certain wavelength ranges with the aid of a filter layer. In this way, etendue-limited systems in particular, which are based on full conversion of the excitation radiation, can be made significantly more efficient compared to known technical solutions by means of the directional radiation generation in the structured layer of the converter element.

According to a further development of the invention, the radiation source is designed to emit visible white light or visible converted light, with the colors characteristic of the RGB color space, namely red, green and blue.

According to a further embodiment, the radiation source has one LED or a plurality of LEDs. These can be arranged next to each other in an array-like manner and can be individually controlled.

According to another embodiment, the radiation source may be a pixelated array in which, for example, individual pixels of a larger component may be individually turned on and off.

The use of a photonic structure as described herein in combination with very small LEDs, such as the LEDs mentioned above, or with pixelated arrays is advantageous because classical optics such as lenses can only be used to a very limited extent in small dimensions. Furthermore, by means of a photonic structure, the contrast between neighboring pixels can be improved due to the directionality provided thereby.

According to a further embodiment, the radiation source can also be designed as a chip-size package. In particular, this is a component without a proper housing. For such components, the type of optical elements described herein is particularly advantageous, since conventional lenses cannot be mounted well on the very compact components or significantly enlarge the component.

Furthermore, the invention also relates to a method of manufacturing a radiation source having at least one of the special properties described above. The method is characterized in that the structure is formed by at least one etching step in a semiconductor substrate of the LED. It is advantageous here if the structure, in particular specifically selected recesses in the structure, are at least partially filled with the converter material.

There may be a need for structures by means of which outcoupling, in particular light outcoupling, can be provided from a semiconductor body.

According to a first aspect, a method for manufacturing a device, in particular an electronic component, in particular an opto-electronic component, in particular a light-emitting diode, is proposed, wherein for generating a coupling-out structure, in particular an optical structure, in a surface region of a semiconductor body providing the device, structuring the surface area and planarizing the structured surface area to obtain a planarized surface of the surface area. Planarizing means in particular forming a flatness, which can also be referred to as planarity.

According to a second aspect, a device, in particular an electronic device, in particular an opto-electronic device, in particular light emitting diode, is proposed, wherein a decoupling structure has been created in a surface region of a semiconductor body providing the device by means of patterning the surface region and planarizing the patterned surface region to obtain a planarized surface of the surface region.

With a proposed decoupling structure, light can be emitted from a surface perpendicular to it.

According to a proposed embodiment, patterning of the surface region of the semiconductor body, which may likewise be referred to as a raw chip, may be performed by means of generating a random topology at the surface region.

According to another proposed embodiment, a generation of the random topology may be performed by means of directly roughening the surface of the surface region of the semiconductor body comprising a first material.

According to another proposed embodiment, a generation of the random topology can be performed by applying a transparent second material having a large refractive index, in particular larger than 2, in particular Nb2O5, to the surface region and roughening the second material. This second material can be applied as a layer to the surface area.

According to another proposed embodiment, patterning of the surface region of the semiconductor body, by means of generating an ordered topology at the surface region, may be performed.

According to another proposed embodiment, the ordered topology can be created by applying a transparent second material, in particular Nb2O5, having a high refractive index, in particular greater than 2, and patterning periodic photonic crystals or non-periodic photonic structures, in particular quasi-periodic or deterministic aperiodic photonic structures, into this material. The second material may be applied as a layer.

A photonic crystal is a periodic structure that produces a band structure for photons by a periodic variation of the optical refractive index. This band structure can comprise a band gap in a certain frequency range. This property can alternatively be generated with non-periodic but nevertheless ordered structures. Such structures are in particular quasiperiodic or deterministic aperiodic photonic structures. These can be, for example, spiral arrangements.

According to another proposed embodiment, planarization of the surface region of the semiconductor body can be performed by attaching transparent third material with a low refractive index, in particular less than 1.5, in particular SiO2, to the surface region. The third material can be applied as a layer.

According to another proposed embodiment, an attachment of SiO2 as a transparent third material with low refractive index can be performed using TEOS (tetraethyl orthosilicate).

According to another proposed embodiment, thinning of the third low refractive index material may be performed until the surface is flat and/or smooth with highest elevations in the first material of the semiconductor body or in the second high refractive index material.

According to another proposed embodiment, thinning can be performed using chemical mechanical polishing (CMP).

According to another proposed embodiment, transferring the device can be performed using stamp technology.

According to another proposed embodiment, the planarized surface may be flat and/or smooth and have a roughness in the range of less than 20 nanometers, in particular less than 1 nanometer, as a mean roughness value.

According to another proposed embodiment, the outcoupling structure may comprise a transparent third material with a small refractive index, in particular SiO2, on a roughened first material of the semiconductor of the device.

According to another proposed embodiment, the outcoupling structure may comprise a transparent third material with a small refractive index, in particular SiO2, on a roughened transparent second material with a large refractive index, in particular Nb2O5, wherein the second material may be attached to a first material of the semiconductor of the device.

According to another proposed embodiment, the outcoupling structure may comprise a transparent third material of small refractive index, in particular SiO2, on a transparent second material of large refractive index, wherein the second material is attached to a first material of the semiconductor of the device and may comprise periodic photonic crystals or non-periodic photonic structures, in particular quasi-periodic or deterministic aperiodic photonic structures.

It may also be desirable to provide an improved optoelectronic device that emits light at least substantially perpendicular to an emitting surface.

The invention also relates to an optoelectronic device comprising an arrangement having a plurality of light sources for generating light emerging from a light emitting surface from the optoelectronic device, and further comprising at least one photonic structure disposed between the light emitting surface and the plurality of light sources.

By means of the at least one photonic structure, which may be in particular a photonic crystal or pillar structures, also referred to herein as column structures, beam shaping of the emitted light may be effected before the light leaves the device through the light emitting surface.

The photonic structure can be designed in particular for beam shaping of the light generated by the light sources. In particular, the photonic structure can be designed in such a way that the light emerges at least substantially perpendicularly from the light-emitting surface. The directionality of the emitted light can thus be improved.

Photonic crystals are known per se. In particular, these are periodic structures of the optical refractive index occurring or created in transparent solids. In particular, so-called two-dimensional photonic crystals are relevant here, which exhibit a periodic variation of the optical refractive index in two mutually perpendicular spatial directions, in particular in two mutually perpendicular spatial directions running parallel to the light-emitting surface.

According to one embodiment of the invention, the device is an array comprising as light sources a plurality of pixels arranged in a layer, and a photonic crystal is arranged or formed in the layer. Thus, the photonic crystal may be directly arranged in the layer in which the pixels of the array are arranged. In this case, the photonic crystal may be arranged in the layer above the light sources, so that the photonic crystal is nevertheless located between the light sources and the light-emitting surface.

In particular, the layer may comprise a semiconductor material, and the photonic crystal may be patterned in the semiconductor material. For example, GaN or AlInGaP material systems can be used as semiconductor material. GaN stands for gallium nitride and AlInGaP for aluminum indium gallium phosphide. Examples of other possible material systems are AlN (for aluminum nitride) and InGaAs (for indium gallium arsenide).

The photonic crystal can be realized by forming a periodic variation of the optical refractive index in the semiconductor material, whereby a material with a high refractive index, such as Nb2O5 (niobium (V) oxide), can be used for this purpose and introduced into the semiconductor material accordingly. The photonic crystal is preferably formed as a two-dimensional photonic crystal, which comprises a periodic variation of the optical refractive index in two mutually perpendicular spatial directions in a plane parallel to the light exit direction.

According to one embodiment of the invention, the device is an array comprising as light sources a plurality of pixels arranged in a first layer, and a photonic crystal is arranged in an additional, second layer, the second layer being located between the first layer and the light emitting surface. The photonic crystal may thus be arranged or accommodated in the additional second layer above the layer having the plurality of pixels. The photonic crystal can be formed as a two-dimensional photonic crystal. The photonic crystal can be realized by means of holes or recesses introduced into a material with a high refractive index, for example Nb2O5. The photonic crystal may thus be formed or formed by forming the corresponding patterning in the high refractive index material. The photonic structures may be filled with a low refractive index material, for example silicon dioxide.

According to one embodiment of the invention, the array may comprise a plurality of LEDs as light sources, the LEDs being arranged in a first layer, and a photonic crystal being arranged or formed in a further, second layer, the second layer being located between the first layer and the light emitting surface. In combination with a particularly array-like arrangement of LEDs, a photonic crystal can be provided in an additional, second layer above the first layer comprising the LEDs. This is preferably designed as a two-dimensional photonic crystal and realized in the form of a periodic variation of the optical refractive index in two spatial directions parallel to the light-emitting surface and perpendicular to each other. As an example of a material with a high refractive index, Nb2O5 can again be mentioned here, and the photonic crystal can be structured by means of holes or recesses in the material with the high refractive index. The photonic structures can be filled with a material with a lower refractive index, for example silicon dioxide.

LEDs can be distinguished between horizontal and vertical LEDs. In the case of horizontal LEDs, the electrical connections are located on the back of the LED facing away from the light-emitting surface. In contrast, a vertical LED comprises one electrical connection on the front and one electrical connection on the back of the LED. The front side faces the light emission surface.

For pixelated arrays, where the electrical contacts of both polarities are on the backside, the entire array surface can be patterned, e.g. in the form of a photonic crystal, especially without leaving out mesa trenches or contact areas. A similar arrangement results for arrays of horizontal light-emitting diodes under a carrier substrate.

According to one embodiment of the invention, in an array or arrangement of horizontal light-emitting diodes for electrical contacting of the light sources, both poles may be electrically connected in each case by means of a contacting layer reflecting the generated light, the contacting layer being located below the photonic structure and the light sources as viewed from an upper light-emitting surface. The contacting layer can comprise at least two electrically separated areas to avoid a short circuit between the poles.

According to another embodiment of the invention, in an arrangement of vertical light-emitting diodes for electrical contacting of the light sources, a first pole facing away from the light-emitting surface, in particular a positive pole, may be electrically connected to a contacting layer reflecting the generated light, the contacting layer being located below the photonic structure and the light sources as viewed from an upper light-emitting surface.

According to one embodiment of the invention, the respective other, in particular negative, second pole facing the light-emitting surface can be electrically connected by means of a layer of an electrically conductive and optically transparent material, in particular ITO. A filler material may be arranged between the layer and the specular contacting layer.

According to one embodiment of the invention, each of the light sources may comprise a recombination zone and the photonic crystal may be located so close to the recombination zones that the photonic crystal alters an optical density of states present in the region of the recombination zones, in particular such that a band gap is created for at least one optical mode with a propagation direction parallel and/or at a small angle to the light emitter surface. To effect the optical band gap in the region of the recombination zone, it is advantageous if the photonic crystal is located very close to the recombination zone. Furthermore, to form the band gap, it is advantageous if, viewed in a direction perpendicular to the light-emitting surface, the height of the photonic crystal is large, in particular equal to or above 300 nm. By means of the photonic crystal, directionality can thus be achieved for the emitted light already in the light generation region, since the emission of light with a propagation direction parallel and/or at a small angle to the light emission surface can be suppressed. The generation of light can then take place exclusively in a limited emission cone perpendicular to the light emission surface. The opening angle of the emission cone depends on the photonic crystal and can be a small value, for example maximum 20°, maximum 15°, maximum 10° or maximum 5°.

The photonic crystal may be positioned with respect to a plane parallel to the light-emitting surface, regardless of the positioning of the light points.

The photonic crystal can be fabricated using a per se known lithography technique. Possible per se known technologies are for example nanoimprint lithography or immersion EUV stepper, where EUV stands for extreme ultraviolet radiation.

The photonic structure may include a plurality of pillar structures extending at least partially between the light emitting surface and the plurality of light sources, each pillar being associated with a light source and aligned with the light emitting surface when viewed in a direction perpendicular to the light emitting surface.

The pillars can also be referred to as columns. The pillars or columns have a longitudinal axis that preferably extends perpendicular to the light emitting surface. When a pillar and an associated light source are aligned, it is particularly meant that the extended longitudinal axis of the pillar intersects the center of the light source.

Viewed transversely to the longitudinal axis, the pillars can have a circular, square or polygonal cross-section. The pillars preferably have an aspect ratio of height to diameter of at least 3:1, with height measured in the direction of the longitudinal axis of the pillars.

In particular, the pillars are formed of a material with a high refractive index, such as Nb2O5. Due to the higher refractive index compared to the surrounding material, the light emission in a direction parallel to the longitudinal axis of the pillars can be increased compared to other spatial directions. The pillars act as waveguides. In this case, light is coupled out more efficiently along the longitudinal axis of the pillars than along other propagation directions. The directionality in the direction of the longitudinal axis of the light can thus be improved. Since the longitudinal axis of the light is preferably perpendicular to the light-emitting surface, improved light decoupling perpendicular to the light-emitting surface can also be achieved.

The array may be an array having as light sources a plurality of pixels disposed in a first layer, and the pillars may be disposed in a further, second layer, the second layer being between the first layer and the light emitting surface. The pillars may thus be arranged on the surface of the pixelated array. In this case, the pillar or column structures may be free-standing and formed of a material with a high refractive index. In addition, the free space between the pillars can be filled with a filler material, e.g. silicon dioxide, with a low refractive index.

The arrangement may comprise as light sources a plurality of LEDs disposed in a first layer, and the pillars may be disposed or formed in a further, second layer, the second layer being between the first layer and the light emitting surface.

The arrangement may be an array comprising as light sources a plurality of pixels arranged in a first layer, and the pillars may also be arranged in the first layer. In particular, the pillars may be arranged in the first layer such that at least a respective part of a pillar is closer to the light emitting surface than the light source associated with the pillar. The pillar may thereby act as a light waveguide between the light source and the light emitting surface. The pillars may be formed of a semiconductor material of the array provided in the first layer, the semiconductor material comprising a high refractive index. In particular, semiconductor material in the first layer can be removed by etching such that the pillars remain. The spaces between the pillars can in turn be filled with a low refractive index material.

The array may be an array having as light sources a plurality of pixels, in particular in the form of LEDs, the pixels being formed in the pillars. An array can thus be created such that the individual pixels have the form of pillars. In this case, each pillar is preferably an LED and functions as a single pixel. Viewed with respect to the longitudinal axis of a pillar, the length of the pillar may correspond to half a wavelength of the emitted light, and the recombination zone of the LED formed by a pillar is preferably located in the center of the pillar. The recombination zone is thus located in a local maximum of the photonic density of states. The light emission parallel to the longitudinal direction of the pillars can thus be significantly increased. Due to the waveguide effect, the light with propagation direction parallel to the longitudinal axis is additionally coupled out more effectively than light of other propagation directions.

The aspect ratio of height to diameter of a pillar is preferably 3:1. At common emission wavelengths, pillars have a height of about 100 nm and a diameter of 30 nm. Upscaled, larger heights or diameters are also possible and are easier to manufacture. The space between the pillars containing the light sources can be filled with material, for example silicon dioxide, which has a lower refractive index than the semiconductor material for the pillars.

In the case of a pillar having a light source, a p-contact can be made on the underside of the pillar facing away from the light-emitting surface. An n-contact can be made, for example, at half the height of the pillars on the top side of the pillar. The n-contact can be made via a transparent conductive material, in particular as an intermediate layer in the filler material or as the top layer above the pillars. A possible material for an n-contact layer is, for example, ITO (indium tin oxide). An inverse arrangement of n- and p-contact is also possible.

In particular, in an arrangement of light-emitting diodes shaped as pillars or columns, in particular vertical light-emitting diodes for electrical contacting, one, in particular positive, first pole in each case can be electrically connected to a reflective contacting layer, which can be formed on and/or along first longitudinal ends of the light-emitting diodes.

The respective other, in particular negative, second pole can be electrically connected to a further layer of an electrically conductive and optically transparent material, in particular ITO. This layer can be arranged as an intermediate layer in the center of the pillars or columns or at and/or along second longitudinal ends of the pillars, the second longitudinal ends being opposite to the first longitudinal ends.

According to a further aspect, an optoelectronic device for generating an emission of light perpendicular to an emitting surface from an array comprising pixels, in particular planar pixels, or from an array of light emitting diodes is proposed, wherein optically acting structures, in particular nanostructures such as a photonic crystal or a pillar structure, are structured along the entire emitting surface to the perpendicular emission of the light.

According to a further aspect, a method for manufacturing an optoelectronic device for generating an emission of light perpendicular to an emitting surface from a, in particular planar, pixelated array or from an array of light emitting diodes is proposed, wherein optically acting structures are patterned along the entire emitting surface to the perpendicular emission of the light.

Planar array means in particular an array having a substantially planar surface. A surface of an array or array is also preferably smooth. A pixelated array is in particular a monolithic pixelated array.

All mentioned materials, especially the materials in a photonic crystal, a pillar, or the filling materials preferably have a low absorption coefficient. The absorption coefficient is here in particular a measure for the reduction of the intensity of electromagnetic radiation when passing through a given material.

In the following, exemplary embodiments of the invention are explained in more detail with reference to the attached figures.

The figures show, schematically in each case:

FIG. 1 a perspective view of a first variant of a lighting unit according to the invention.

Figure 2:
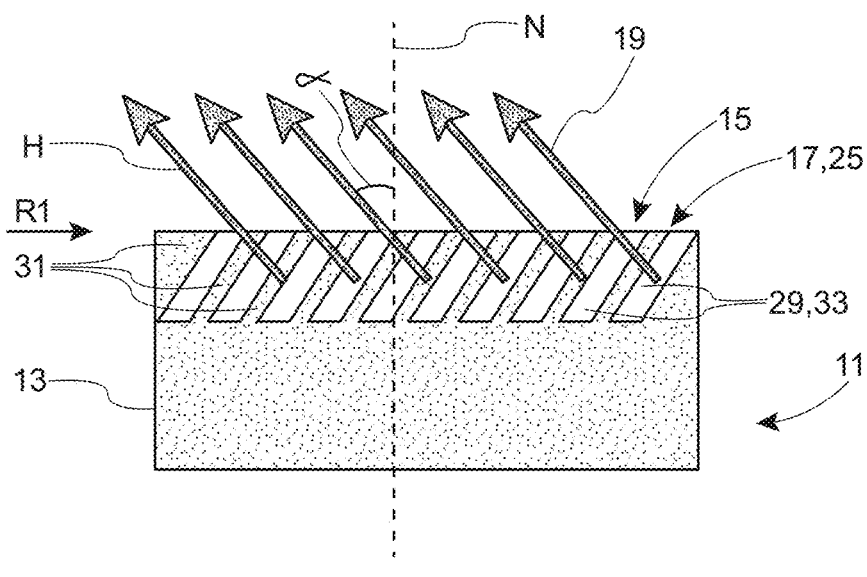

FIG. 2 a sectional view of a second variant of a lighting unit according to the invention.

Figure 3:
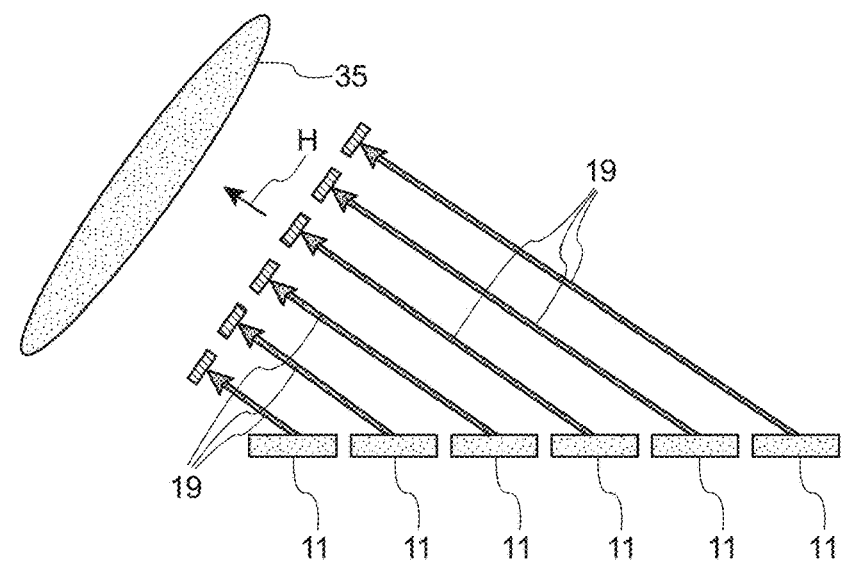

FIG. 3 an arrangement of a plurality of lighting units of FIG. 2.

Figure 4:
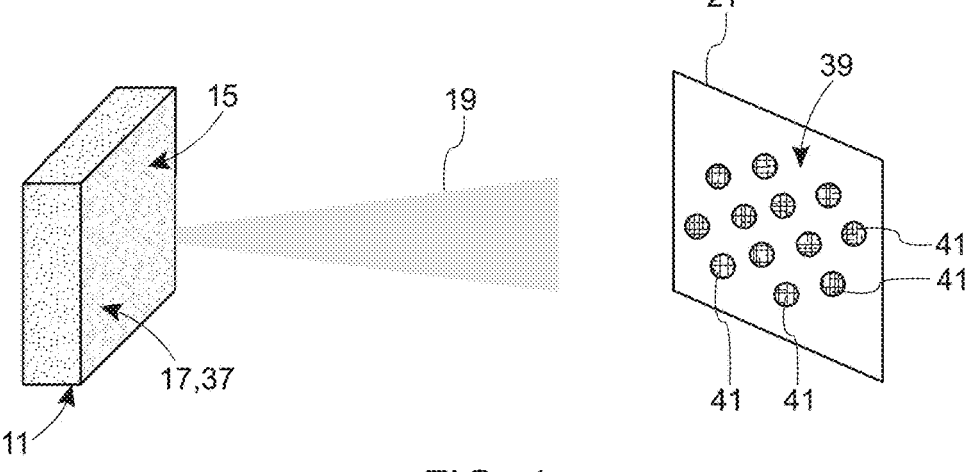

FIG. 4 a perspective view of a fourth variant of a lighting unit according to the invention.

Figure 5:
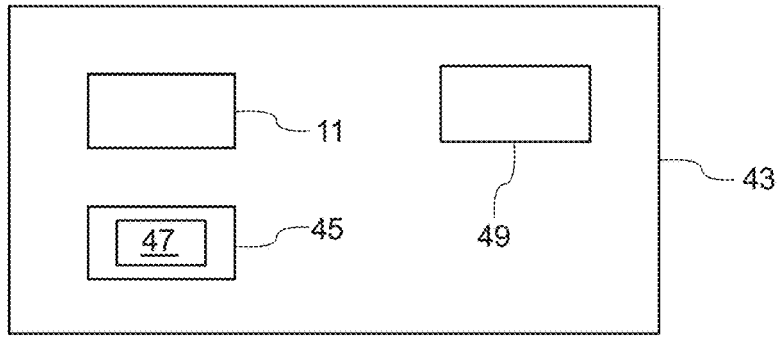

FIG. 5 a block diagram of a surface topography detection system with an illumination unit of FIG. 4.

Figure 6:
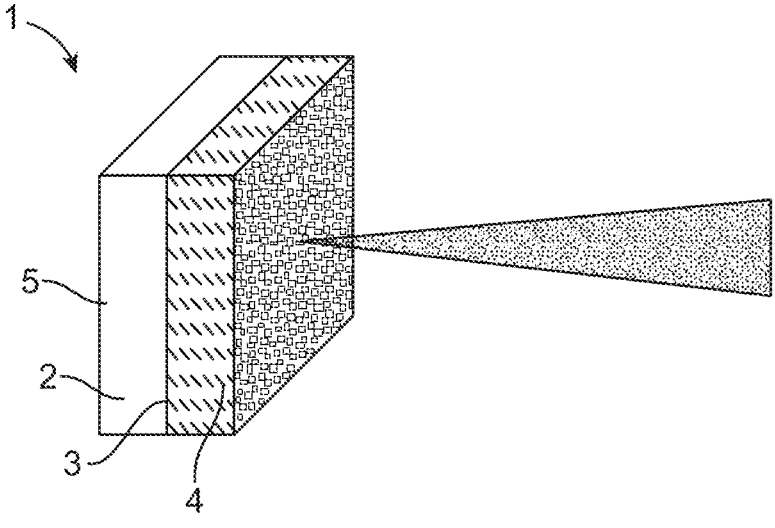

FIG. 6 an illumination unit with an emitter unit that has a light-emitting surface on which a polarization element with a three-dimensional photonic structure is applied.

Figure 7:
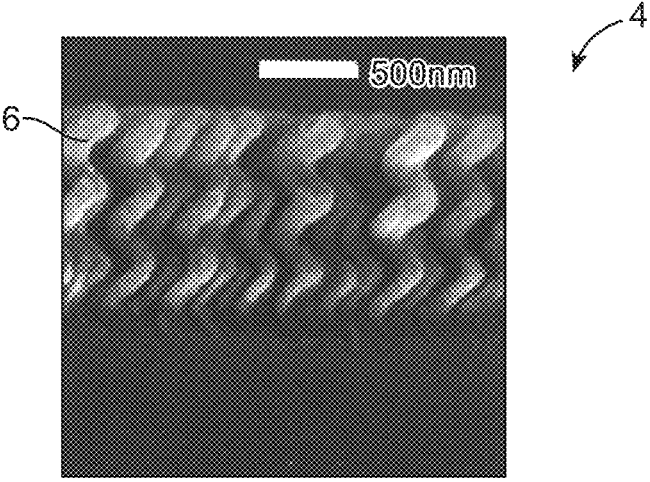

FIG. 7 a representation of a three-dimensional photonic structure with a plurality of spiral-shaped structural elements.

Figure 8:
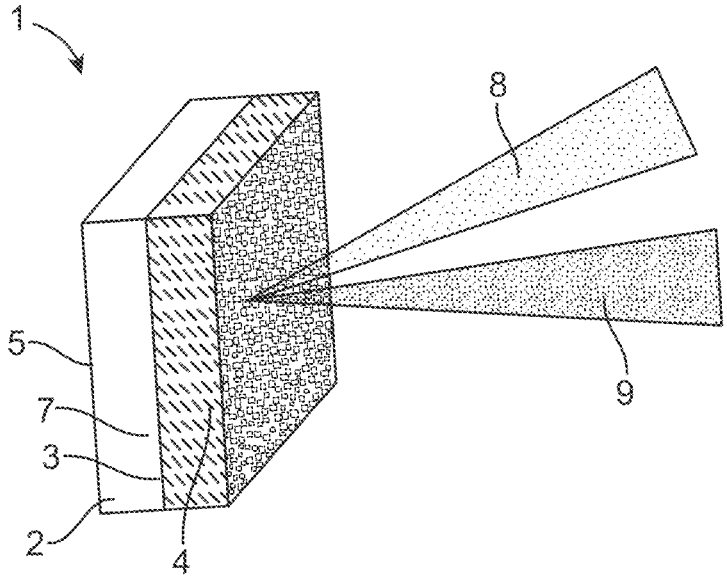

FIG. 8 an illumination unit with an emitter unit having a light-emitting surface on which a polarization element with a three-dimensional photonic structure having wavelength-selective properties is applied.

Figure 9:
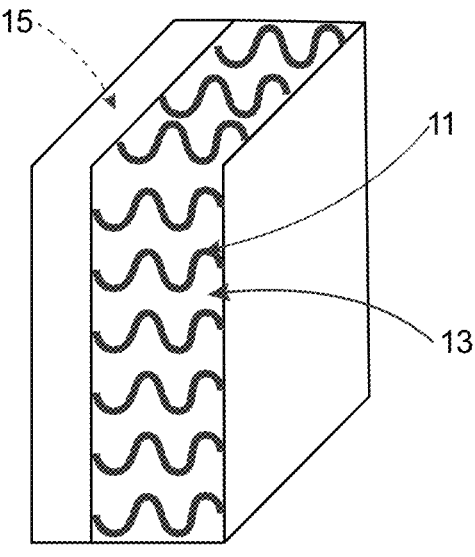

FIG. 9 an illumination unit with an emitter unit and a three-dimensional photonic structure in which converter material is filled.

Figure 10:
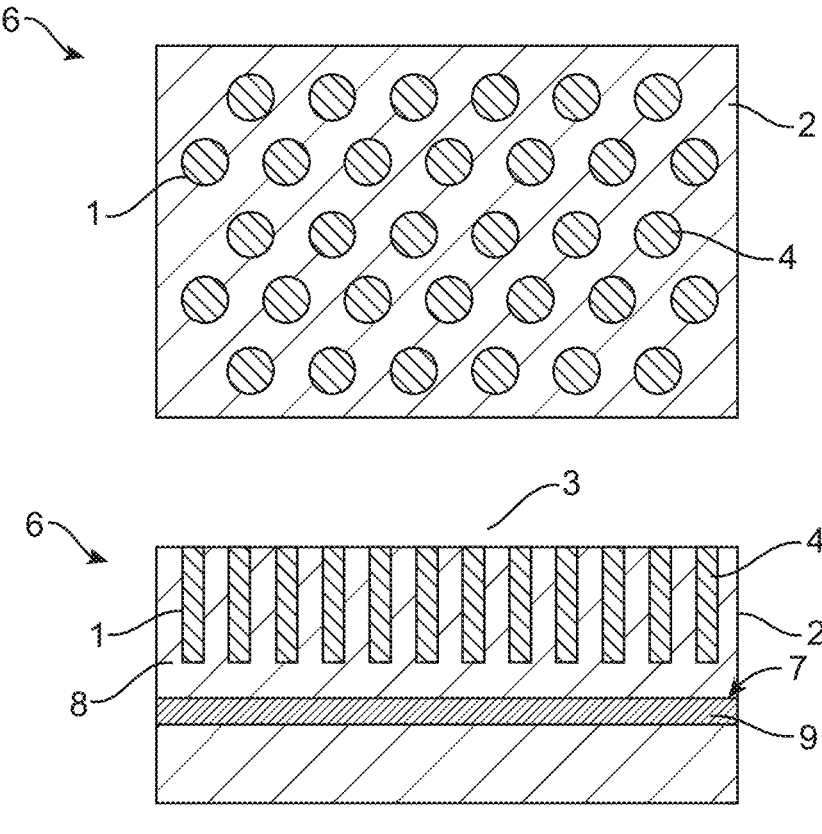

FIG. 10 a top view and sectional view of a radiation source, with an LED and a converter element formed by a patterned layer filled with converter material located only in the uppermost layer of the LED semiconductor material.

Figure 11:
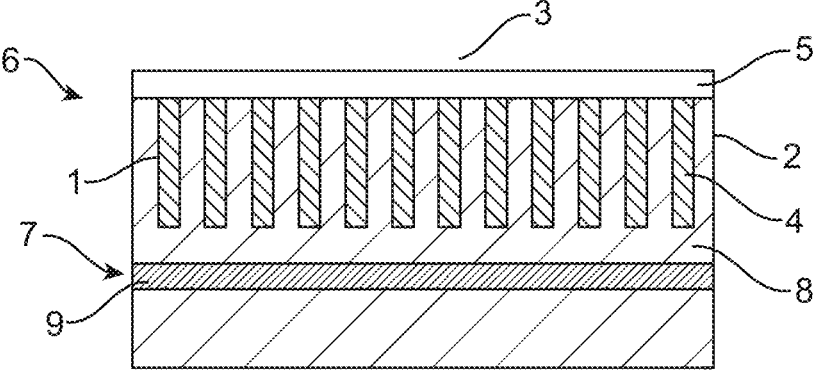

FIG. 11 a cross-section of a radiation source having an LED, a converter element formed by a patterned layer filled with converter material located only in the uppermost layer of the LED semiconductor material, and a filter layer applied to the uppermost layer of the LED semiconductor material.

Figure 12:
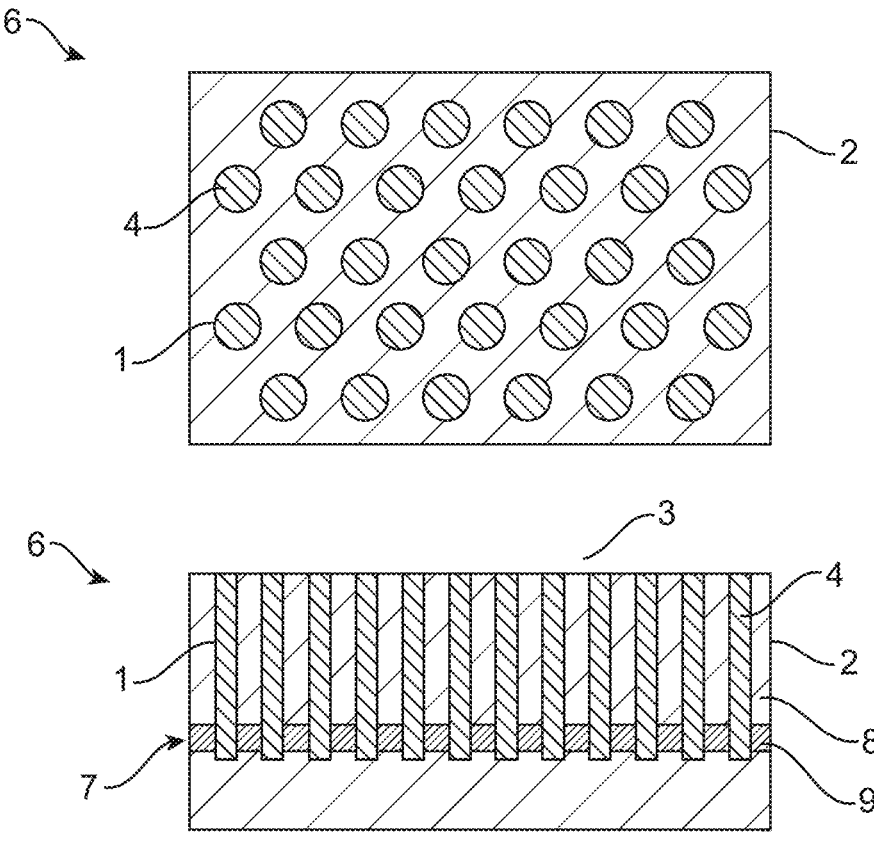

FIG. 12 a top view and sectional view of a radiation source with LED and converter element formed by a structured layer filled with converter material extending into the active zone of the LED semiconductor material.

Figure 13:
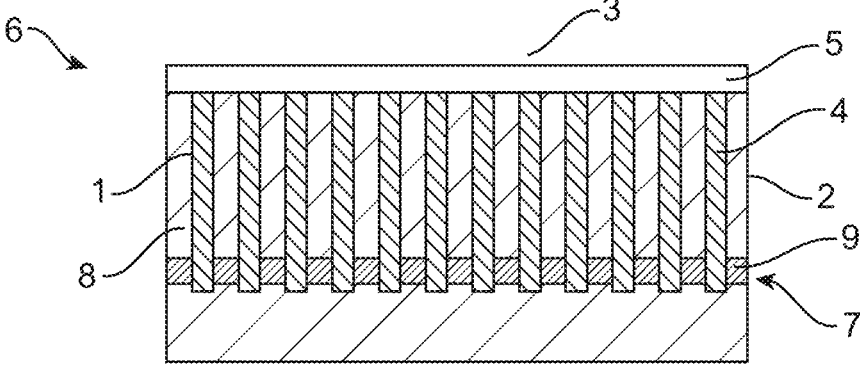

FIG. 13 a cross-section through a radiation source having an LED, a converter element formed by a patterned layer filled with converter material extending into the active region of the LED semiconductor material, and a filter layer applied to the uppermost layer of the LED semiconductor material.

Figure 14:
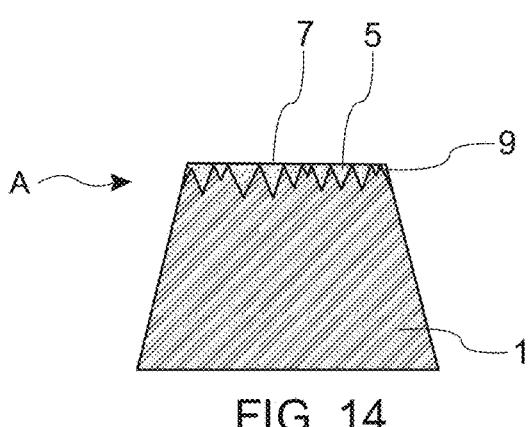

FIG. 14 an embodiment of a proposed device.

Figure 15:
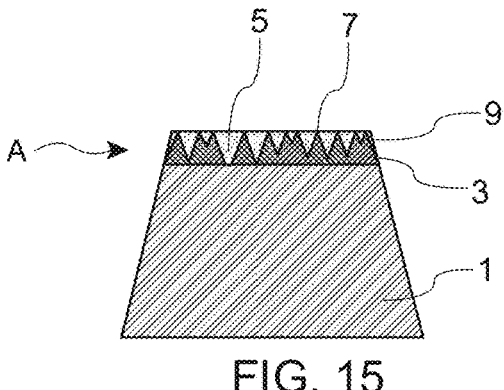

FIG. 15 another embodiment of a proposed device.

Figure 16:
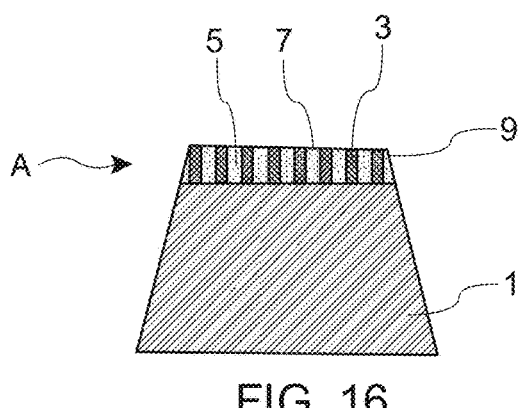

FIG. 16 another embodiment of a proposed device.

Figure 17:
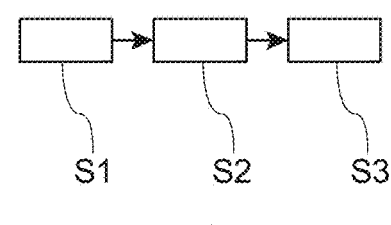

FIG. 17 an embodiment of a proposed method.

Figure 18:
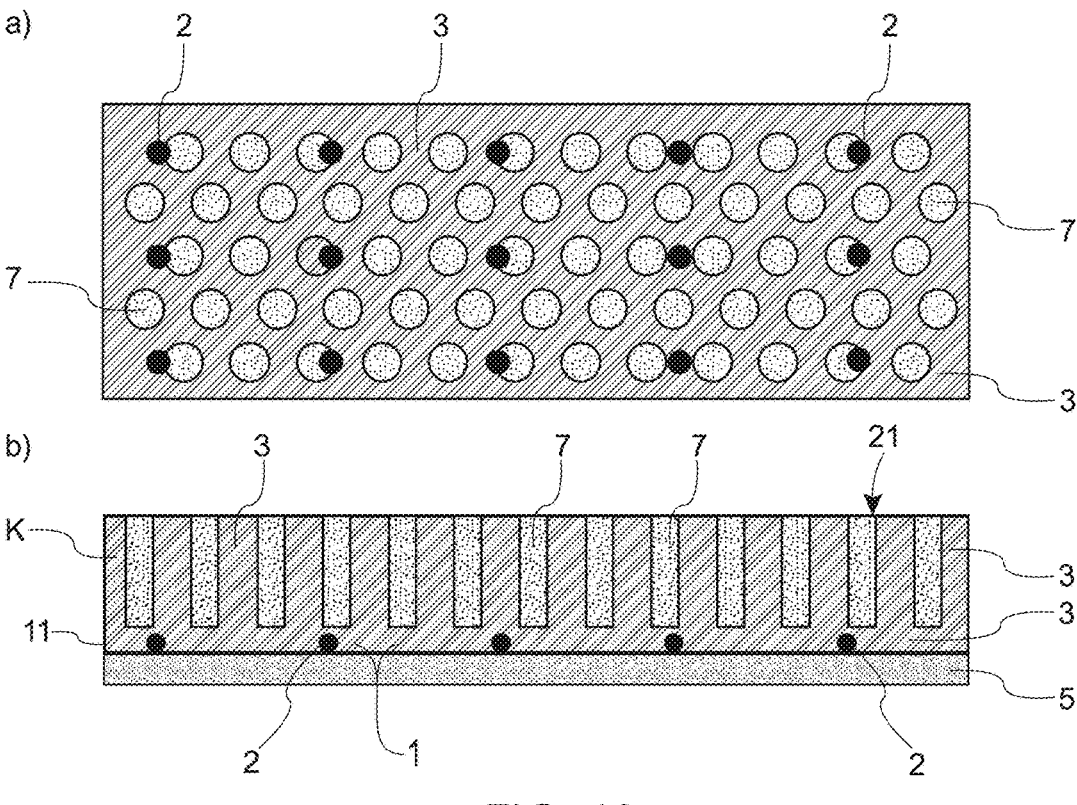

FIG. 18a a first proposed device in a plan view.

FIG. 18b the first proposed device in cross section.

Figure 19:
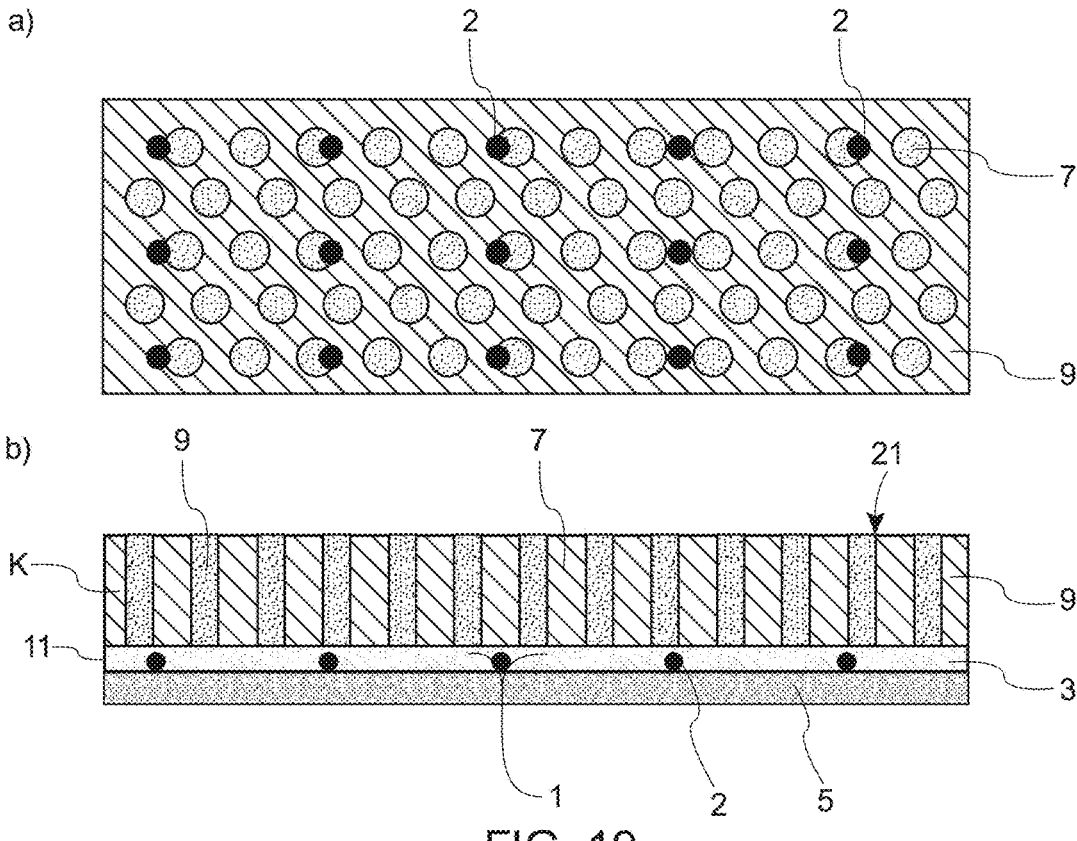

FIG. 19a a second proposed device in a plan view.

FIG. 19b the second proposed device in cross-section.

Figure 20:
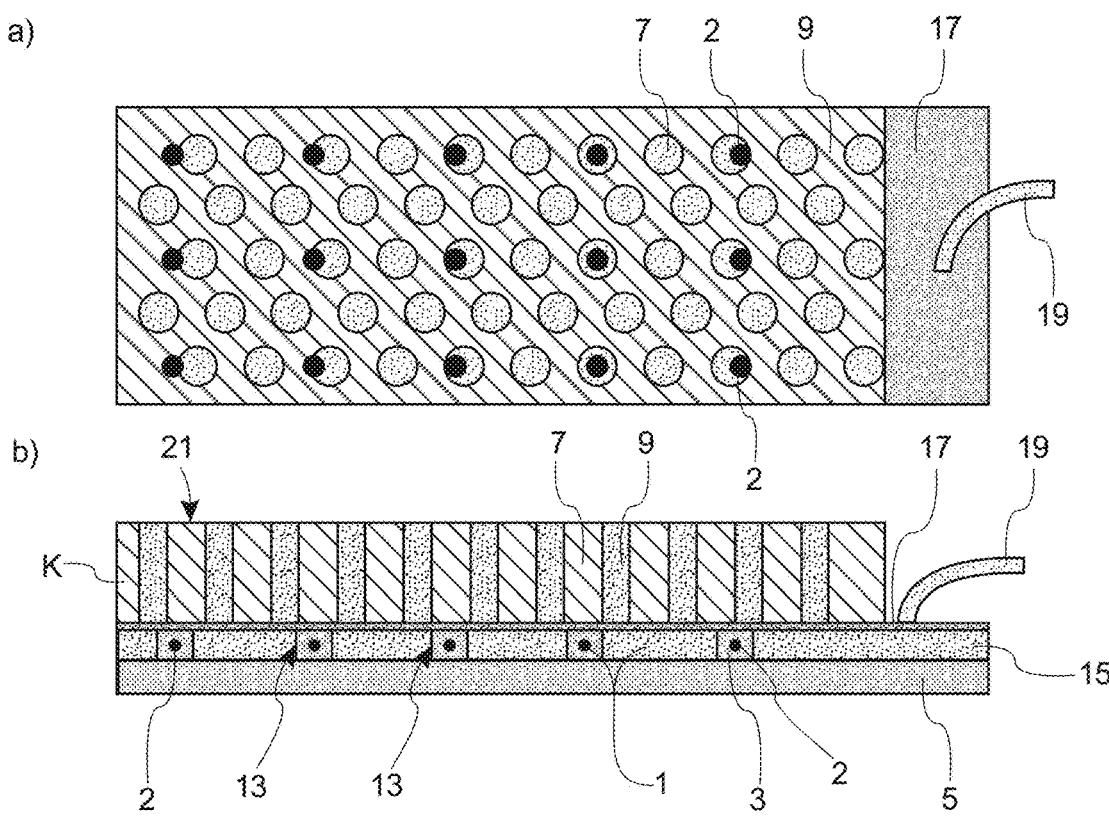

FIG. 20a a third proposed device in a plan view.

FIG. 20b the third proposed device in cross-section.

Figure 21:
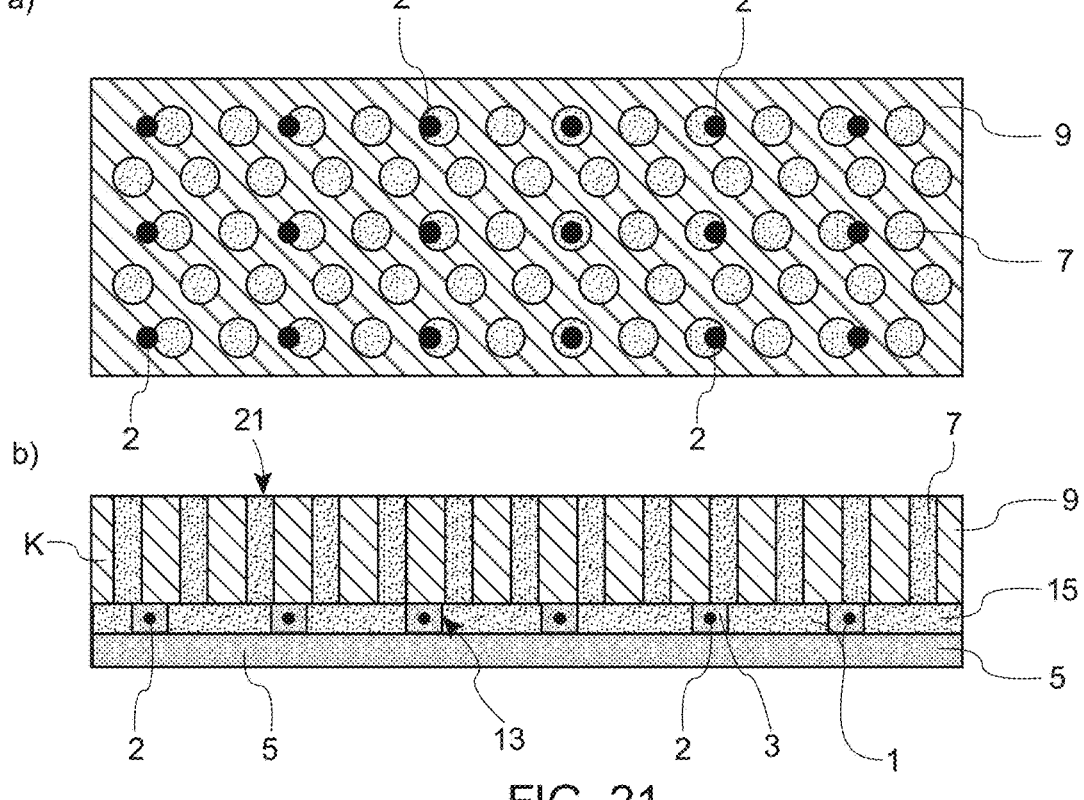

FIG. 21a a fourth proposed device in a plan view.

FIG. 21b the fourth proposed device in cross-section.

Figure 22:
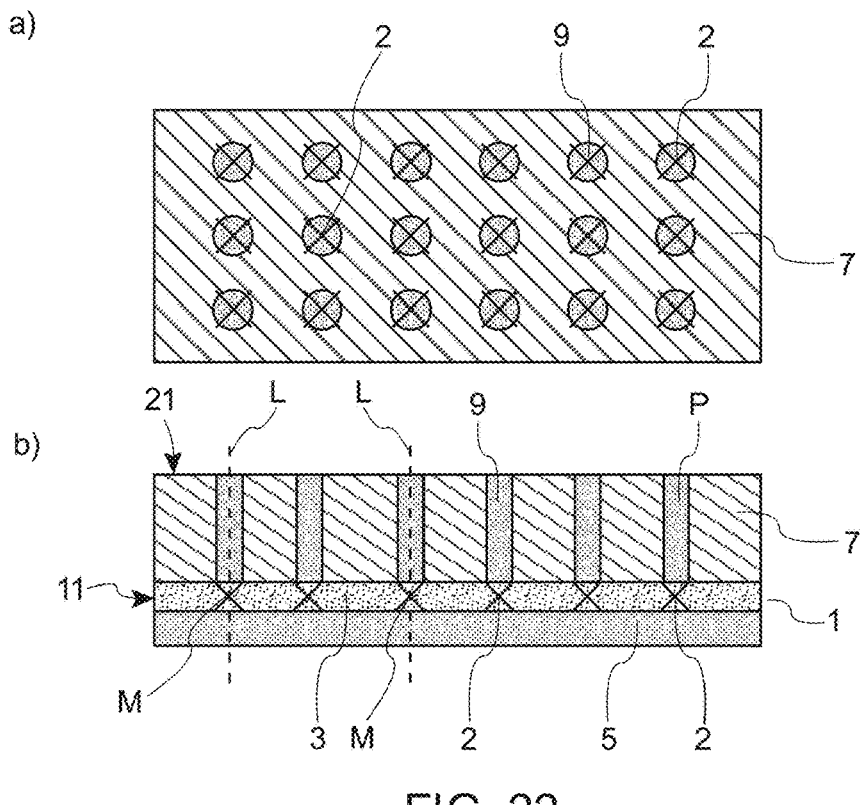

FIG. 22a a fifth proposed device in a plan view.

FIG. 22b the fifth proposed device in cross-section.

Figure 23:
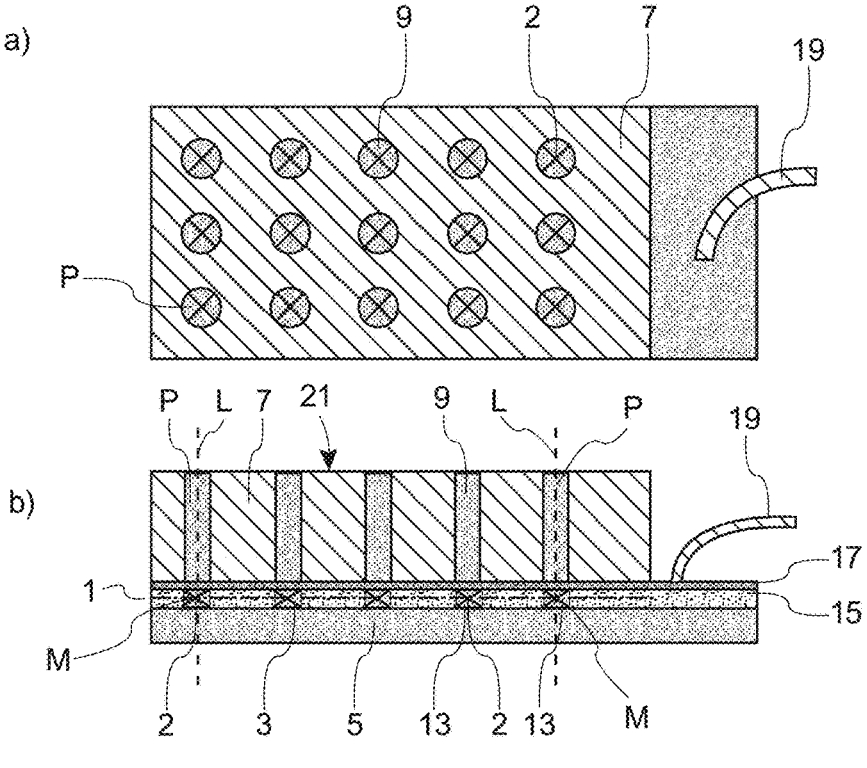

FIG. 23a a sixth proposed device in a plan view.

FIG. 23b the sixth proposed device in cross-section.

Figure 24:
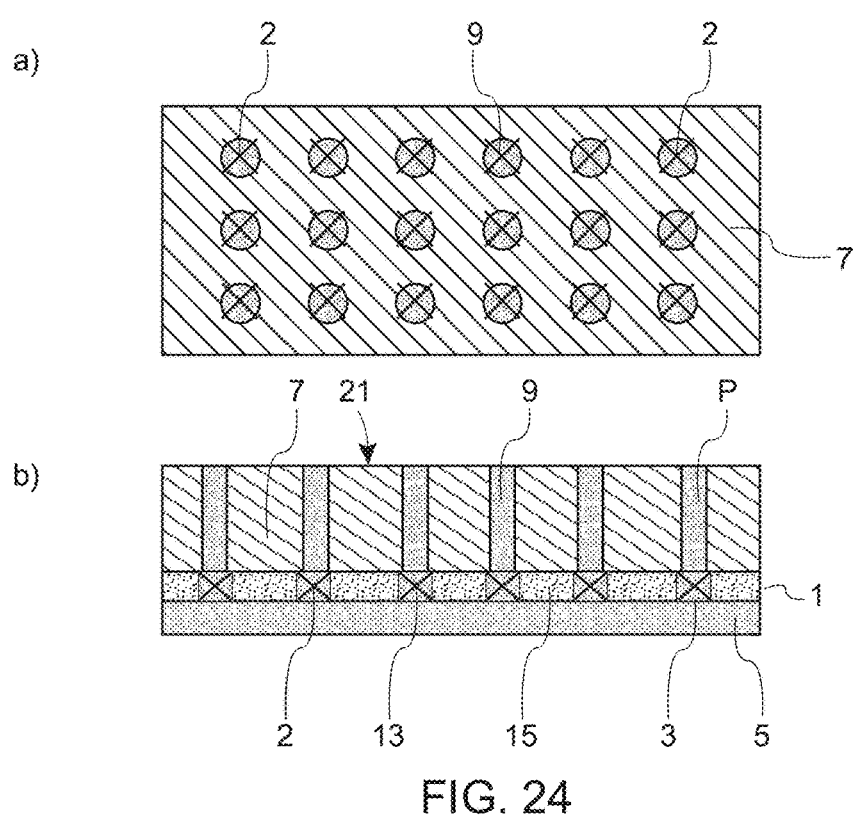
Figure 24:
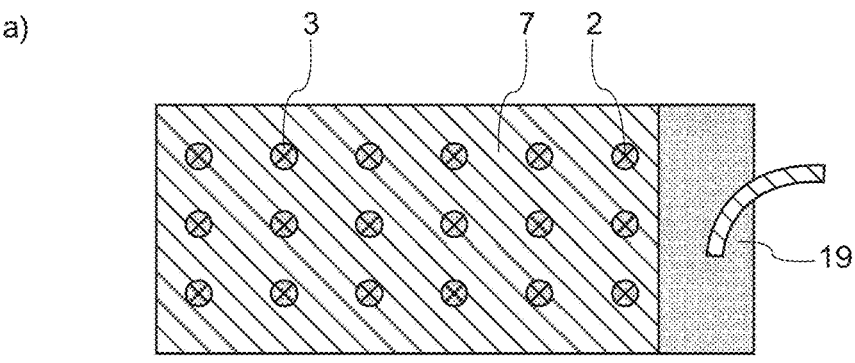

FIG. 24a a seventh proposed device in a plan view.

FIG. 24b the seventh proposed device in cross-section.

Figure 25:
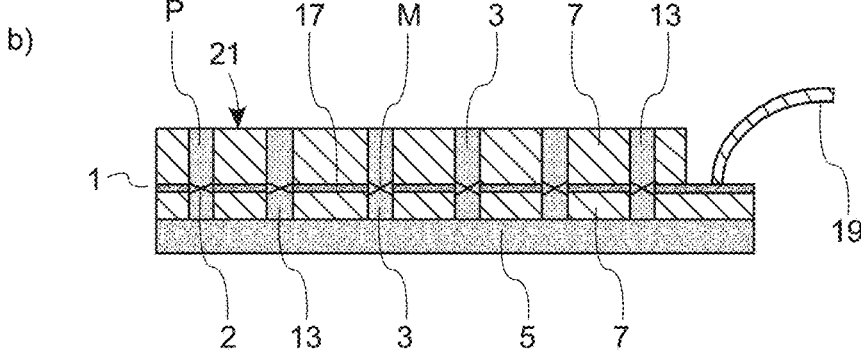

FIG. 25a a top view of an eighth proposed device.

FIG. 25b the eighth proposed device in cross-section.

Figure 26:
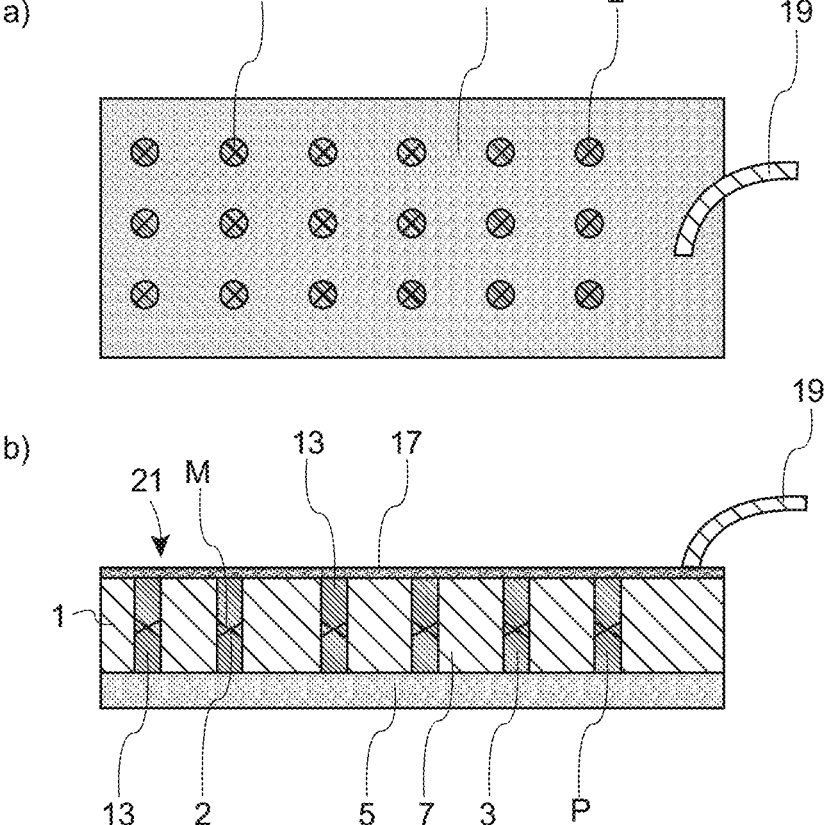

FIG. 26a a ninth proposed device in a plan view.

FIG. 26b the ninth proposed device in cross-section.

Figure 27:
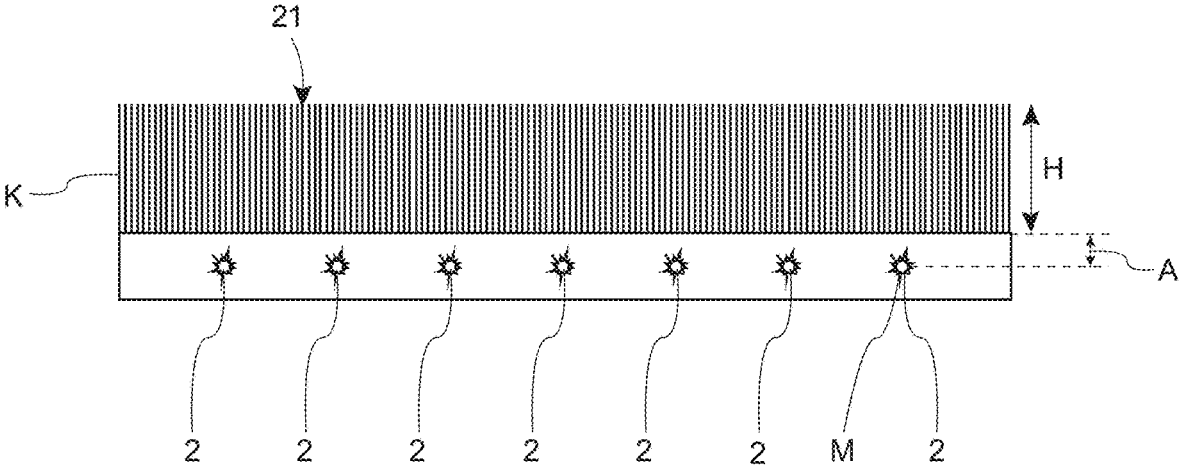

FIG. 27 a cross-sectional view of a further variant of a device according to the invention.

The illumination unit 11 shown in FIG. 1 comprises at least one optoelectronic emitter unit 13, which is designed to emit electromagnetic radiation 19, such as visible or infrared light of a wavelength, via a light emitter surface 15. In this regard, a photonic structure 17 is provided for beam shaping the electromagnetic radiation before it exits via the light emitting surface 15. The photonic structure 17 shapes the electromagnetic radiation 19 such that the electromagnetic radiation 19 has a defined characteristic 23 in the far field 21.

In particular, the photonic structure 17 of the illumination unit 11 of FIG. 1 is a one-dimensional photonic crystal 25. In the variant shown, this extends to the light-emitting surface 15. The end face of the photonic crystal 25 thus forms the light-emitting surface 15. The one-dimensional photonic crystal 25 exhibits a periodic variation of the optical refractive index along a first direction R1.

The crystal 25 or periodic variation is set to beamform electromagnetic radiation emitted from a light source (not shown) of the emitter unit. In particular, light propagation along the first direction R1 is blocked. As a result, the radiated emitted radiation 19 exhibits only a slight extension along the first direction R1 in the far field 21. Thus, a characteristic feature of the electromagnetic radiation 19 in the far field 21 is that it forms a narrow strip 27. The electromagnetic radiation 19 is therefore collimated with respect to the first direction 19.

The light source is in particular an LED. This is typically a Lambertian radiator. By using the photonic structure 17 and the resulting beam shaping, a directed, collimated electromagnetic radiation 19 can be generated.

As FIG. 1 schematically shows, the emitted electromagnetic radiation 19 leaves the emitter unit 13 in the form of a light cone fanning out essentially along a second direction R2. The central axis of the light cone extends along a main radiation direction H which is perpendicular to the light emission surface 15. Not shown is an optional collimating optical system arranged downstream of the light-emitting surface 15, as seen in the main radiation direction H. The optional optical system can be used to fan out the electromagnetic light cone. By means of the optics, the electromagnetic radiation 19 can be collimated in the second spatial direction R2, which extends orthogonally to the first spatial direction R1. The electromagnetic radiation 19 can thus be collimated in the far field 21 with respect to the two directions R1, R2. A luminous point is formed.

An illumination device 11 according to FIG. 1 is particularly well suited for use in an optical scanner. In this case, the illumination device 11 can be used in particular for line scan applications due to the strip-like light image in the far field 21.

In the illumination device 11 shown in FIG. 2, a one-dimensional photonic crystal 25 is formed on the top surface of the emitter unit 13. The face of the crystal 25 forms the light emitting surface 15 for electromagnetic radiation generated by an optoelectronic light source, for example an LED, which is not shown, and is emitted through the photonic crystal 25 via the light emitting surface 25.

In contrast to the variant according to FIG. 1, in the illumination unit of FIG. 2 the main radiation direction H of the electromagnetic radiation 19 runs at an angle α to the normal N of the light emission surface 15. The angle α is not equal to zero degrees. For example, the angle α can be in the range between 30 and 60 degrees. This is achieved by the one-dimensional photonic crystal 25 having a periodically repeating sequence of two materials 31, 33 with different optical refractive indices extending in a first direction R1. The materials 31, 33 have a parallelogram-like cross-section and abutting interfaces of the materials 31, 33 do not run orthogonally but inclined to the light-emitting surface 15, as schematically shown in FIG. 2.

Such a structure can be formed, for example, by etching trenches 29 running parallel to each other at an angle to the light-emitting surface 15 into the substrate 31 having the light-emitting surface 15. The trenches 29 may be filled with a material 33 having a different optical refractive index than the substrate material 33 etched away, and the angle α may depend on the slope of the trenches 29 with respect to the light-emitting surface 15. The width of the trenches 29 and the width of any respective substrate material 31 remaining between two trenches 29 will affect the wavelengths at which the photonic crystal 25 can have an effect. Typically, the width of the trenches 29 and the width of the substrate material 33 located between two trenches, and thus the periodicity of the photonic crystal structure 25, are matched to the wavelength of electromagnetic radiation provided by the light source or a converter material located between the light source and the photonic crystal.

By means of the one-dimensional photonic crystal 25, the illumination unit 11 of FIG. 2 can again generate a light strip 27 in the far field 21, as were described with reference to FIG. 1. In contrast to the variant of FIG. 1, the main radiation direction H in the variant of FIG. 2 is tilted by an angle α with respect to the normal N. By means of downstream collimation optics, the strip 27 can be brought into a point or circular structure in the far field 21.

The variant shown in FIG. 3 comprises a line-like or array-like arrangement of a plurality of illumination units 11 of FIG. 2. The light beams 19 emitted by the individual illumination units 11 have the same main radiation direction H. The light beams 19 can also be collimated by an additional, collimating optical system 35, in particular a lens. The light beams 19 can also be collimated by an additional collimating optical system 35, in particular a lens, in a second direction which is perpendicular to the image plane in the representation of FIG. 2. Thus, a point or circular image of the emitted radiation 19 is obtained in the far field behind the optics 35.

The use of a photonic crystal in an illumination device 11 according to FIGS. 2 and 3 results in an effectively higher resolution for a line- or array-like arrangement of the illumination devices 11 according to FIG. 3. In addition, smaller beam cross sections can be realized, in particular in the far field downstream of the optics 35. Since collimation in the first direction R1 (cf. FIG. 2) is already performed by the photonic crystals 25 integrated in the illumination devices 11, the optics 35 and possibly further, subsequent optics can be designed more compactly.

In the variant of FIG. 4, the illumination unit 11 comprises a photonic structure 17, which is a two-dimensional photonic crystal 37 whose end face forms the light emission surface 15. Viewed from the light emission surface 15, at least one optoelectronic light source, optionally with converter material, is arranged behind the photonic crystal 37. The photonic crystal 37 is designed to shape the electromagnetic radiation 19 emitted via the light-emitting surface in such a way that it generates a defined, discrete, pattern 39 in the far field 21. In the example shown, the pattern 39 comprises a plurality of distributed light spots 41, although other patterns are possible.

The illumination unit 11 of FIG. 4 is suitable for use, for example, in a surface topography detection system 43 exemplified in the block diagram of FIG. 5. In addition to the illumination unit 11, the system 43 includes a detection unit 45 having a camera 47 configured to detect the pattern 39 when it illuminates an object (not shown).

Further provided is an analysis device 49 adapted to determine a distortion of the pattern 39 with respect to a predetermined reference pattern. The reference pattern may be determined, for example, from the detection of the pattern 39 when it is projected onto a flat surface.

The analysis device 49 is further configured to determine a shape and/or a structure of the object illuminated by the pattern 39 in the far field 39 as a function of the determined distortion of the pattern 39. By means of the system 43, a face recognition can thus be realized, for example.

In the variant according to FIG. 4, downstream optics for pattern generation can be dispensed with, since the pattern 39 can already be generated by means of the photonic crystal 37. The illumination device 11 according to FIG. 4 and, consequently, the system 43 according to FIG. 5 can therefore be realized in a particularly compact form.

FIG. 6 shows an illumination unit 1 with an emitter unit 2, which has a light emission surface 3 on which a polarization element 4 in the form of a polarization layer with a three-dimensional photonic structure is applied. According to the embodiment example shown in FIG. 6, the emitter unit 2 is an LED 5 that emits light in the visible or possibly also in the ultraviolet wavelength range. The light emitted by the LED 5 is guided into the three-dimensional photonic structure and polarized here in a specific direction of oscillation, depending on the embodiment and dimensions of the structure. Depending on the design of the three-dimensional photonic structure, circular or linear polarization can take place. It is essential that only light with a certain polarization is emitted by the illumination unit 1.

If the three-dimensional photonic structure of the polarization element 4 has spiral-shaped structural elements 6, as shown in FIG. 7, circular polarization takes place. If, on the other hand, the structural elements of the three-dimensional photonic structure are rod-shaped, in particular as so-called nanorods, linear polarization of the radiation guided through the three-dimensional photonic structure is effected as a result.

The illumination unit 1 shown in FIG. 6 is manufactured using the two-photon lithography process, the glancing angle deposition process, laser interference lithography or holographic structuring. In this context, it is noted that the spiral-shaped structural elements 6 shown in FIG. 7 have been produced using the glancing angle deposition process.

An illumination unit 1, as shown in FIG. 6, can be combined in an advantageous manner with further illumination units that have complementary properties. Thus, illumination units 1 for image generation are combined which have different polarization and/or transmission properties.

Radiation generated by multiple illumination units, each with complementary properties, polarized in different directions of oscillation is preferably imaged onto a display or screen using common optics. Such devices can advantageously be used in applications to generate three-dimensional images.

With the three-dimensional photonic structure arranged on the surface or the light emission surface 3 of an LED chip according to FIG. 6, which forms a polarization element 4, it is possible to generate light with fundamentally different properties, in particular with defined polarization, than is possible with currently known LEDs. The major advantage here is that, due to the provision of a three-dimensional photonic structure on the chip surface, no additional optical components, such as a classic polarization filter, are required. The illumination unit can therefore be designed comparatively small. Due to the structuring directly on the semiconductor chip of the LED 5, such an illumination unit 1 is also more energy-efficient than the known illumination units in which a subsequent selection of the polarization takes place. Any photon that does not pass through the three-dimensional photonic structure due to its properties remains in the LED chip and can be re-emitted by a reabsorption process.

FIG. 8 shows an illumination unit 1 with an emitter unit 2 having a light-emitting surface 3 on which a polarizing element 4 with a three-dimensional photonic structure having wavelength-selective properties is applied.

In this case, the photonic structure is designed as a three-dimensional photonic crystal. Alternatively, several two-dimensional photonic crystals can be arranged in layers on top of each other.

The three-dimensional photonic structure is designed in such a way that it has a wavelength-specific transmittance and polarization properties. This means that the transmittance and the polarization properties of the three-dimensional photonic structure vary depending on the wavelength of the incident radiation.

The illumination unit 1 shown in FIG. 8 has an emitter unit, which in turn has an LED 5. Furthermore, a converter element 7 with a layer of converter material is provided. The converter material emits, due to excitation by excitation radiation 8 emitted from the LED 5, a converted radiation 9 having a wavelength changed from the wavelength of the excitation radiation 8.

If both unconverted excitation radiation 8 and converted radiation 9 impinge on the three-dimensional photonic structure, these radiations are influenced in different ways depending on their wavelength with respect to transmission and polarization. As can be seen in FIG. 8, the converted radiation 9 is coupled out perpendicular to the surface of the LED chip, while the excitation radiation 8 is deflected laterally.

Such illumination units can be used in a preferred manner in components in which radiation with different wavelengths is generated, whereby different functions can be implemented in a combination of LEDs and converter elements. Depending on the design of the three-dimensional photonic structure as well as the wavelength of the excitation radiation 8 emitted by an LED in each case, it is possible to achieve complete suppression of the excitation radiation 8 while the converted radiation 9 radiates through the three-dimensional photonic structure. Similarly, it is conceivable that the excitation radiation 8 is deflected while the converted radiation 9 is coupled out perpendicular to the chip surface, as shown in FIG. 8. Of course, the mechanism can also be the other way around. Furthermore, it is also conceivable to polarize the converted radiation 9 in a special way, while the excitation radiation 8 emerges unchanged over the chip surface. Here, too, the mechanism can be reversed.

The variant of an illumination unit shown in FIG. 9 comprises an emitter unit, here again in the form of an LED 15, and a three-dimensional photonic structure 11, for example in the form of a spiral. Converter material 13 is filled into the structure 11.

FIG. 10 shows in a top view and a sectional view a radiation source 6 with an LED and with a layer 2 arranged in a semiconductor substrate 8 of the LED 7, which has a structure 4 with a suitable converter material. The structured layer 2 with the converter material forms a converter element 1, wherein the converter material emits converted radiation into an emission area 3 of the radiation source 6 when excited by the excitation radiation emitted by the LED 7.

The structure 4 provided in the layer 2 with the converter material is designed in such a way that the converted radiation is emitted exclusively as a directed beam into a specific radiation area 3.

According to the embodiment example shown in FIG. 10, the converted radiation is emitted perpendicular to a plane in which the LED chip with its semiconductor substrates is located.

The patterned layer 2 shown in FIG. 10 is a two-dimensional photonic crystal etched into the LED semiconductor substrate. The individual, here rod-shaped, recesses of the structure 4 have been filled with the converter material. The layer thickness of the structure 4 is at least 500 nm, so that a band gap is created in the crystalline solid material, which causes directionality of the converted radiation emitted by the converter element 1.

By means of such a photonic structure, the directionality and thus also the efficiency, in particular also of etendue-limited systems, can be considerably increased. Due to the provision of a layer 2 with a corresponding structure 4 and suitable converter material directly on the surface of the LED 7, the otherwise additionally provided optical elements can be dispensed with and thus a comparatively small radiation source can be realized by exploiting the invention.

The radiation source 6 shown in FIG. 10 can also be used to realize very small components, such as pixelated LED arrays for high-resolution displays, or integrated components, for example for the field of consumer electronics.

Incidentally, an energetically particularly efficient radiation source is provided since, on the one hand, no light is emitted in a direction that is not required and is not perpendicular to the LED chip surface and, on the other hand, all of the converted light can be used. Furthermore, modes of the excitation radiation emitted by the LED 7, which are guided in the active zone 9 and have a low extraction efficiency from the LED 7, can thus also be converted efficiently.

In addition, FIG. 11 shows a sectional view of a radiation source 6 which is designed as explained in connection with FIG. 10, but additionally has a filter element 5 applied to the uppermost layer of the radiation source 6 in the form of a filter layer 5 which is opaque to radiation of selected wavelength ranges. The filter layer 5 has here preferably the function of a color filter.

Such a technical design is particularly suitable for radiation sources 6 in which an LED 7 and a converter element 1 are combined in such a way that the light emitted by the LED 7 is fully converted. With the aid of a suitably designed filter layer 5, the radiation emitted into the radiation area 3 can thus be limited to radiation with a desired wavelength. Likewise, such a filter layer 5 can be used to ensure that excitation radiation emitted by the LED 7, which is not converted into converted radiation by the converter element 1, is prevented from escaping into the radiation area 3 by means of the filter layer 5, if required.

FIG. 12 again shows a radiation source 6, which has an LED 7 and a converter element 1 applied to a semiconductor substrate 8 of the LED 7. The converter element 1 has a layer 2 with converter material and a structure 4, which is applied to a semiconductor substrate 8 of the LED 7. The structured layer 2 is preferably a photonic crystal, a quasiperiodic or deterministic aperiodic photonic structure. The structure 4 of the layer 2 is filled with suitable converter material.

In contrast to the embodiment example explained in FIG. 10, however, the patterned layer 2 is not only arranged in a semiconductor substrate in the upper region of the radiation source 6, but extends into the active zone 9 of the LED 7. Again, a patterned layer 2 with a layer thickness greater than 500 nm is provided, thus creating an optical band gap. Also in this case, modes of the excitation radiation emitted by the LED 7, which are guided in the active zone 9 and have a low extraction efficiency from the LED, can be efficiently converted.

In addition, FIG. 13 shows an embodiment of a radiation source 6 which is designed as shown in FIG. 12 and additionally has a filter element 5 applied to the uppermost layer of the radiation source 6, which is designed in the form of a filter layer serving as a color filter. Such color filters offer the possibilities of limiting the emission of the converted radiation into the radiation area in the case of a full conversion of the excitation radiation emitted by the LED 7, or of selectively suppressing the emission of non-converted excitation radiation in the case of an incomplete conversion.

FIG. 14 shows an embodiment of a proposed device. According to FIG. 14, a semiconductor body comprising a first material 1 is shown, which can also be referred to as a raw chip and which is formed here as a light-emitting diode.

A decoupling structure A is formed. A planarized surface 7 is formed on a surface region 9 of the semiconductor body providing the device. The surface area 9 is structured for this purpose and then planarized.

The semiconductor body can be produced epitaxially in such a way that the surface region 9 was produced facing away from a carrier not shown. In principle, all surface regions of a semiconductor body providing the device can be structured and then planarized for the formation of, in particular, optical outcoupling structures A. Other wavelengths of electromagnetic radiation can also be coupled out if the structuring and planarization are matched to this.

FIG. 14 shows a patterning of the surface region 9 of the semiconductor body, wherein a random topology is generated at the surface region 9. The random topology is formed here by directly roughening the first material 1 of the semiconductor body on the surface region 9.

Topology here is in particular a spatial structure.

Then the surface area 9 of the semiconductor body is planarized by applying a transparent third material 5 with a low refractive index, in particular less than 1.5. This is followed by a thinning of the applied transparent third material 5 with a low refractive index until the surface 7 of the structured surface area 9 is even and/or smooth with the highest elevations in the first material 1 of the semiconductor body. The third material 5 can be applied as a layer.

Thinning can be done by chemical mechanical polishing (CMP). Possible structures embossed in a surface area 9 can be random topologies, such as roughened surfaces. Random topologies such as roughened surfaces are already used in larger LEDs.

Light extraction is improved by an extraction structure A with a planarized surface 7. According to FIG. 14, the first material 1 of the LED semiconductor or LED raw chip, for example, is first directly structured.

The transparent third material 5 with low refractive index used for planarization can be SiO2, and this can be applied in particular using TEOS (tetraethyl orthosilicate).

The refractive index, also called refractive index or optical density, formerly also refractive index, is an optical material property. It is the ratio of the wavelength of light in a vacuum to the wavelength in the material, and thus of the phase velocity of light in a vacuum to that in the material. The refractive index is dimensionless, and it generally depends on the frequency of the light, which is called dispersion. At the interface of two media of different refractive indices, light is refracted and reflected. In this process, the medium with the larger refractive index is called the optically denser one.

Small refractive indices can be smaller than 1.5 in particular. Other usable materials with a small refractive index include crown glass with a refractive index of, for example, 1.46, PMMA with a refractive index of, for example, 1.49, and fused silica with a refractive index of, for example, 1.46. These refractive indices are obtained at the 589 nm wavelength of the sodium D-line. A refractive index of silicon dioxide is, for example, 1.458. Other materials can also be used.

Identical reference signs in all figures indicate identical features.

FIG. 15 shows a second embodiment of a proposed device.

To improve light extraction, a transparent second material 3 with a large refractive index can be applied to the light-emitting diode and structured in a suitable manner as an alternative to the embodiment example shown in FIG. 15. A suitable second material 3 with a high refractive index is, for example, Nb2O5. This alternative is shown in FIG. 15 and FIG. 16.

A large refractive index can in particular be greater than 2. Other usable materials with a large refractive index include, for example, zinc sulfide with a refractive index of, for example, 2.37, diamond with a refractive index of, for example, 2.42, titanium dioxide with a refractive index of, for example, 2.52, silicon carbide with a refractive index of, for example, 2.65, and titanium dioxide with a refractive index of, for example, 3.10. These refractive indices result, in particular, at the 589 nm wavelength of the sodium D-line. A refractive index of niobium(V) oxide is, for example, 2.3. Other materials can also be used.

A decoupling structure A is formed in a surface region 9 of a semiconductor body providing the device. Likewise, structuring of the surface region 9 is performed here.

The structuring of the surface area 9 is carried out, as is also the case in FIG. 14, by generating a random topology on the surface area 9. While according to FIG. 14 the random topology is generated by directly roughening the surface 7 of the surface area 9 of the semiconductor body comprising a first material 1, according to FIG. 15, the random topology is formed by applying, in particular layer by layer, a transparent second material 3 having a large refractive index, in particular greater than 2, to the surface region 9 and by roughening the second material 3.

This is followed by planarization by applying, in particular in layers, a transparent third material 5 with a low refractive index, in particular less than 1.5, to the structured surface area 9. The third material 5 can be applied as a layer. Afterwards, the attached transparent third material 5 with low refractive index is thinned until the surface 7 of the structured surface area 9 is even and/or smooth with the highest elevations in the second material 3 with high refractive index.

The transparent third material 5 with low refractive index can be SiO2, and this is applied in particular by means of TEOS (tetraethyl orthosilicate). Thinning can be performed by chemical mechanical polishing (CMP).

FIG. 16 shows an embodiment of a proposed device.

Alternatively, for structuring a surface area 9, ordered topologies can likewise be created at the surface area 9.

The ordered topology is created here by applying, in particular layer by layer, a transparent second material 3 having a large refractive index, in particular greater than 2, to the surface region 9 and structuring periodic photonic crystals or non-periodic photonic structures, in particular quasi-periodic or deterministic aperiodic photonic structures, into the second material 3.

Alternatively, periodic photonic crystals or non-periodic photonic structures, in particular quasi-periodic or deterministic aperiodic photonic structures, can in principle be patterned directly, without a second material 3, into the first material 1 of the semiconductor body. In this context, a device with an outcoupling structure A can be formed, wherein a transparent third material 5 with a small refractive index, in particular SiO2, has been applied to a first material 1 of a semiconductor of a device and periodic photonic crystals or non-periodic photonic structures, in particular quasi-periodic or deterministic aperiodic photonic structures, can be patterned into the first material 1.

Photonic crystals consist of structured semiconductors, glasses or polymers and are usually produced by processes known from microelectronics. By means of their specific structure, they force the light to propagate in the medium in the manner required for the component function. This makes it possible not only to guide light to dimensions that are on the order of the wavelength, but also to filter and reflect it in a wavelength-selective manner.

They are periodic dielectric structures whose period length is tuned to affect the propagation of electromagnetic waves in much the same way that the periodic potential in semiconductor crystals affects the propagation of electrons.

They therefore exhibit unique optical properties, such as Bragg reflection of visible light.

In particular, analogous to the formation of the electronic band structure, a photonic band structure is created which can have regions of forbidden energy in which electromagnetic waves cannot propagate within the crystal (photonic band gaps, PBG). Photonic crystals can therefore be regarded in some ways as the optical analogue of electronic semiconductors, i.e. as "optical semiconductors".

After periodic photonic crystals or non-periodic photonic structures, in particular quasi-periodic or deterministic aperiodic photonic structures, have been patterned, a transparent third material 5 with a low refractive index is applied to the patterned surface area 9, in particular in layers, for planarization. Suitable for this purpose is, for example, SiO2, which is deposited with the aid of TEOS (tetraethyl orthosilicate). The third material 5 is then thinned until the surface 7 ends smoothly with the highest elevations in the highly refractive second material 3.

A process suitable for thinning is chemical mechanical polishing (CMP) to uniformly remove layers with thicknesses in the micrometer and nanometer range. The resulting surface is flat and/or smooth. In particular, a roughness is in the range of a few nanometers as the mean roughness value (rms). The planarized surface 7 produced can be used for transferring the light-emitting diodes using the conventional stamping technique.

In this way, a decoupling efficiency can be improved compared to an unprocessed surface. A transfer process by means of stamp technology remains possible.

FIG. 17 shows an embodiment of a proposed method.

A first step S1 is performed to pattern a surface area 9 of a semiconductor body providing the device to form a decoupling structure A. A second step S2 is performed to planarize the patterned surface area 9 to obtain a planarized surface 7 of the surface area 9. A second step S2 planarizes the patterned surface region 9 to obtain a planarized surface 7 of the surface region 9. The planarizing comprises two substeps.

By means of a first substep S2.1, a transparent third material 5 with a small refractive index, in particular less than 1.5, is applied to the structured surface area 9, in particular in layers.

By means of a second sub-step S2.2, the attached transparent third material 5 with a small refractive index is thinned until the surface 7 of the structured surface area 9 is even and/or smooth with the highest elevations in the first material 1 of the semiconductor body or in the second material 3 with a large refractive index.

With a third step S3, a transfer of the device can be carried out by means of stamp technology, whereby the semiconductor body is lifted off at the planarized surface 7.

According to all embodiments described below, GaN, AlInGaP, AlN or InGaAs material systems in particular can be used as semiconductor materials.

FIGS. 18a and 18b show an optoelectronic device for emitting light that preferably emerges vertically from a light-emitting surface 21. The device comprises an array 11 having pixels, wherein optically acting nanostructures in the form of a photonic crystal K are embedded within the light emitting surface 21. The array 11 further comprises an array-like arrangement of light sources, each having a recombination zone 2 lying in a recombination plane 1.

The recombination zones 2 are formed in a first layer of optically active semiconductor material 3 of the array 11. In this layer with the semiconductor material 3, the photonic crystal or photonic crystal structures K are structured, namely in the form of a two-dimensional photonic crystal. In this case, the photonic crystal K is located between the recombination zones 2 and the light emission surface 21. The photonic crystal structures K can be arranged independently of the positioning of individual pixels, whereby in the example shown, one pixel corresponds to a light source with a recombination zone 2.

The optically acting photonic crystal structures K are free-standing in air or, as shown, filled with a, in particular electrically insulating and optically transparent first filler material 7, in particular SiO2, with a refractive index smaller than the refractive index of the semiconductor material 3. The filler material 7 preferably also has a small absorption coefficient.

In the array 11, both electrical poles of a respective light source are electrically connected by means of an optically reflective contacting layer 5 for electrical contacting of the light sources. The contacting layer 5 is located on a side of the optically active semiconductor material 3 facing away from the optically acting photonic crystal structures K and is arranged at the bottom as shown in FIG. 1b. Such a contacting enables very strongly localized recombination zones 2. The contacting layer 5 can thereby have at least two electrically separated areas in order to be able to connect the poles electrically separated from each other.

The photonic crystal K can be structured over the entire emitting surface 21 in such a way that at least approximately only light with a propagation direction perpendicular to the surface 21 can leave the component. If the photonic crystal K is close to the recombination plane 1 and the layer thickness of the photonic crystal K is large compared to the distance to the recombination zone 2, the optical density of states in the light generation region is additionally changed.

Thus, a complete band gap for optical modes with propagation direction parallel and at a small angle to the surface of the, in particular planar, i.e. in particular flat and/or smooth, pixel array 11 can be generated. The emission of light with propagation direction parallel to the emitting surface is then completely suppressed.

In particular, light generation can take place exclusively in a limited emission cone, which is specified by the photonic crystal K. In this case, directionality is already ensured at the level of light generation, which effectively increases the efficiency compared to an angle-selective optical element, since such an element only influences the light extraction.

The alignment of the photonic crystal K is independent of the positioning of the individual pixels, in particular in such a way that an alignment of the pixel structure to the photonic structure K is not necessary and a processing of an entire wafer surface is possible.

Advantageously, the device is homogeneous in its optical properties over the entire surface of the array 11, or varies only slightly so as not to disturb the optical environment of the photonic crystal K.

FIGS. 19a and 19b show a second proposed optoelectronic device in a top view and in cross section, respectively. In the pixelated array 11, the photonic crystal K is arranged in a second layer of a material 9, in particular Nb2O5, over a first layer of the optically active semiconductor material 3, alternatively to the embodiment example according to FIGS. 18a and 18b. In this case, the material 9 has a large optical refractive index, and it is arranged on the flat and/or smooth surface of the semiconductor material 3. Preferably, the material 9 also has a low absorption.

The photonic crystal K may again be free-standing as a two-dimensional photonic crystal made of the aforementioned material 9, in which case air is present in the free space. As shown, the free space can again be filled with a material 7 with a smaller refractive index. A possible filling material is for example SiO2.

The contacting is similar to that shown in FIGS. 18a and 18b and allows for very localized recombination zones 2.

FIGS. 20a and 20b show a third proposed optoelectronic device in plan view and cross-section, respectively. The device shown includes as light sources an array of vertical light-emitting diodes 13 and a two-dimensional photonic crystal structure K disposed in an overlying layer extending beneath the entire emitting surface 21 and formed of a high refractive index material 9. The free spaces of the structure K is in turn filled with filler material 7 of lower optical refractive index.

The vertical light emitting diodes 13 have an upper and a lower electrical contact along a vertically oriented longitudinal axis that is perpendicular to the light emitting surface 21. The light-emitting diodes thus have an electrical contact on their front side and an electrical contact on their rear side. Here, the rear side is referred to as the side of the LEDs 13 facing away from the light-emitting surface 21, while the front side faces the light-emitting surface 21.

The device comprises an electrically conductive and the generated light reflecting contacting layer 5 for electrically contacting the contacts on the rear side of the LEDs 13. For electrically contacting the contacts on the front side of the LEDs 13, a third layer is provided which comprises an electrically conductive and optically transparent material 17, for example ITO. An electrical connection to the corresponding pole of a current source can be established via a bonding wire 19.

In and along the recombination plane 1, a further, in particular electrically insulating, filler material 15 can be arranged between the third layer and the optically reflective contacting layer 5.

FIGS. 21a and 21b show a fourth proposed optoelectronic device in plan view and cross-section. The device comprises an array of horizontal light-emitting diodes (LEDs) 13 with respective recombination zones 2 and an optically acting two-dimensional photonic crystal structure K under the entire emitting surface 21. The photonic crystal structure K is located in a layer of a material 9 with a large refractive index, for example Nb2O5. Free spaces are in turn filled with filler material 7, for example silicon dioxide, with lower optical refractive index.

In the case of the horizontal LEDs 13, both electrical contacts are located on the rear side of the LEDs 13. In each case, both poles of the LEDs 13 are electrically connected by means of electrically separated areas of the optically reflective contacting layer 5.

In the region of the recombination plane 1, a filler material 15, in particular an electrically insulating one, is arranged between the material layer 9 and the contacting layer 5.

The efficiency with respect to light generation can be relatively high in the embodiments according to FIGS. 18a to 21b, since in these embodiments directionality or directionality of the light can already be achieved during light generation, in particular if by means of the band structure of the photonic crystal K a higher photonic density of states can be achieved in the region of the recombination zones 2 for the emission of light in the direction perpendicular to the light emission surface. Another advantage may be that the patterning of the photonic crystal K can be homogeneous over an entire wafer. A specific positioning or orientation of the photonic crystal to the individual pixels or light emitting diodes is not required. This can significantly reduce the manufacturing complexity, especially compared to alternative approaches where structures are placed individually over each pixel.

FIGS. 22a and 22b show a fifth proposed optoelectronic device in a top view and in cross section. The device comprises a pixelated array 11 and optically acting pillar structures P, in particular with pillars or columns patterned over the entire emitting surface 21. The array 11 is preferably smooth and planar.

The pixelated array 11 comprises pixels each having a light source comprising a respective recombination zone 2. The recombination zones 2 of the pixels are located in a recombination plane 1 and they are arranged in a first layer with optically active semiconductor material 3.

Pillar structures P are formed above this first layer. A pillar P is thereby associated with a light source, so that each pillar P is arranged directly above the recombination zone 2 of the associated light source. A longitudinal axis L of a respective pillar P runs in particular through the center M of the recombination zone 2 of the associated light source 2.

The Pillars P consist of a material 9 with a high refractive index, for example Nb2O5. A filler material 7 with a lower refractive index, such as silicon dioxide, can be placed in the spaces between the pillars P.

The pillars P can be arranged above the layer with the light sources, in particular by additionally applying the pillars P above the array 11. Alternatively, the pillars can be etched into the semiconductor material 3. For this purpose, the semiconductor material layer must have a correspondingly high configuration. Since the semiconductor material normally has a high refractive index, material can be etched away in such a way that the pillars 9 remain. The areas freed up by the etching can be filled with material with a low refractive index.

The pillars P act as waveguides that direct light upward in the direction of the longitudinal axis L, so that the pillars P can provide enhanced radiation of light in a direction perpendicular to the light emitting surface 21.

In the array 11, for electrical contacting of the light sources with the recombination zones 2, both electrical poles of a light source are electrically connected in each case by means of a reflective contacting layer 5. The contacting layer 5 is formed on a side of the semiconductor material 3 facing away from the optically acting pillar structures P. The contacting layer 5 can have two separate areas in order to be able to electrically contact the two poles separately. Such a type of contacting enables very strongly localized recombination zones 2.

FIGS. 23a and 23b show a sixth proposed optoelectronic device in plan view and cross-section. The device comprises an array of vertical light-emitting diodes 13, also referred to as LEDs. Optically acting pillar structures P, in particular with pillars or columns, are arranged above the arrangement with light-emitting diodes 13. Thereby, the longitudinal axis L of the pillars P runs at least substantially through the centers of the recombination zones 2 of the LEDs 13.

The pillar structures P can be free-standing in air or filled with a first filling material 7, in particular electrically insulating and optically transparent, above the light-emitting diodes. The filling material 7 can have a smaller refractive index than the refractive index of the material 9 of the pillars P and/or the semiconductor material 3 of the LEDs 3.

As already mentioned, the LEDs are vertical light-emitting diodes 13, which have one, in particular positive, electrical pole on their rear side facing the reflective contacting layer 5 and another electrical pole on the front side facing the pillars P. The LEDs are also vertical light-emitting diodes (LEDs).

The pole at the front of the light sources is electrically connected to a corresponding power supply (not shown) by means of a layer of an electrically conductive and optically transparent material 17, in particular ITO, and by means of a contact wire 19. The layer with the material 17 is arranged between the light sources and the pillars 17, as shown.

In this case, a second filler material 15 can be arranged in free spaces in the layer of LEDs 13 and thus between the layer with the material 17 and the contacting layer 5.

The dimensioning of the pillar structures P can correspond to the dimensioning of the light emitting diodes 13 or the pixels of an array 11.

FIGS. 24*a* and 24*b* show a seventh proposed optoelectronic device in a plan view and in cross section. In contrast to the variant of FIGS. 23*a* and 23*b*, the device according to FIGS. 24*a* and 24*b* comprises an arrangement of horizontal light-emitting diodes 13 whose electrical poles are located on the rear side of the light-emitting diodes 13. For electrical contacting, both electrical poles of a light source can be electrically connected via two electrically separated areas of the specular contacting layer 5. The intermediate layer with material 17 as in the variant with vertical light-emitting diodes described above is therefore not required.

Compared to the arrangements with the photonic crystal structures K according to FIGS. 18 to 21, the variants with the pillars P can be manufactured in a simpler way using standard technologies, since the structure sizes are significantly larger with diameters of up to 1 μm or more. The process requirements are thus lower and high-resolution lithography can suffice to manufacture the pillars.

Pillar structures, in particular pillars or columns, made of the optically active semiconductor material 3 or a material 9 with a refractive index as high as possible can be precisely structured via individual pixels of the array 11 or via vertical light-emitting diodes 13 (FIGS. 23*a* and 23*b*) or via horizontal light-emitting diodes 13 (FIGS. 24*a* and 24*b*). The individual pixels or light emitting diodes 13 may be smaller than 1 μm in diameter, and the pillars may have an aspect ratio of height:diameter of at least 3:1. The pillars are preferably etched directly into the semiconductor material 3, as possible in FIGS. 22*a* and *b* and in FIGS. 24*a* and *b*, since no third layer 17 is formed according to FIG. 23*b*, or they consist of another material 9 with a large refractive index and preferably low absorption, which is applied to the surface of the array 11. For example, a possible material with a large refractive index is Nb2O5. The pillar structures can be free-standing or filled with a material 7 with a small refractive index. A possible filling material with low refractive index is for example SiO2. Due to the larger refractive index of the pillars compared to the surrounding material, the emission parallel to the longitudinal axis of the pillars is enhanced compared to other spatial directions. Due to a waveguide effect, light along the longitudinal axis of the pillars is additionally coupled out more efficiently than light with other propagation directions. This can improve the directionality of the emitted light.

FIGS. 25*a* and 25*b* show an eighth proposed optoelectronic device in plan view and cross section. The device comprises an array of light-emitting diodes 13, each of which is in the form of a pillar P and thus in the form of a column.

The length of the pillars P may correspond to half a wavelength of the emitted light in the semiconductor material 3 and the recombination zone 2 may preferably be located in the center M of a respective pillar and thus in a local maximum of the photonic density of states. The aspect ratio height:diameter of the pillars P may be at least 3:1.

In the arrangement shown, the pillars P can be about 100 nm high and have a diameter of only about 30 nm. This requires a very finely resolved structuring technique and can be implemented at wafer level with effort using current manufacturing technologies.

Alternatively, the dimensions can be scaled up to simplify fabrication, with the directionality of the emitted light decreasing as the size of the pillar patterning increases. The length of the pillars P is preferably a multiple of half the wavelength of the emitted light in the semiconductor material, and the respective recombination zone 2 can be located in a maximum of the photonic density of states.

Due to the pillar structuring of the light emitting diodes 13, the emission parallel to the longitudinal axis of the pillars P is effectively amplified by the greater photonic density of states. Due to a waveguide effect, light with propagation direction along the longitudinal axis of the pillars P is additionally coupled out more efficiently than light with other propagation directions. The space between the pillars P is filled with a material 7 which preferably has a very small absorption coefficient and a smaller refractive index than the semiconductor material 3. A possible filling material with a small refractive index is for example SiO2.

In this arrangement of light-emitting diodes 13, which are shaped as pillars P or columns and are in particular vertical, a first pole, in particular a positive pole, is electrically connected in each case by means of a specular contacting layer 5 for contacting recombination zones 2 arranged in a recombination plane 1. The contacting layer 5 is formed at the lower, first longitudinal ends of the light-emitting diodes 13.

The respective other, in particular negative, second pole is electrically connected to a third layer of a conductive transparent material 17, in particular ITO, and is connected by means of a bonding wire 19, for example, to the corresponding pole of a power supply.

According to this arrangement, the third layer is formed in and along the recombination plane 1 in the longitudinal centers of the light emitting diodes 13 formed as pillars P or columns.

FIGS. 26*a* and 26*b* show a ninth proposed optoelectronic device in plan view and cross section. In contrast to the variant of FIGS. 25*a* and 25*b*, the device according to FIGS. 26*a* and 26*b* features vertical LEDs formed as pillars P.

The electrical contact at the bottom, in particular the p-contact, is made via the underside of the pillars P and in particular by contacting the contacting layer 5.

The electrical contact on top, in particular the n-contact, is located on the upper side of the Pillars P. The contact is made via an upper layer with optically transparent and electrically conductive material 17. The upper layer extends over the Pillars P and the first filling material 7, with which the free spaces between the Pillars P are filled. A possible material 17 for the upper layer is, for example, ITO (indium tin oxide). A connection to a power supply can be established via the bonding wire 19.

The electrical contacting of the light emitting diodes in the Pillars P enables very localized recombination zones 2, whereby the upper contact, in particular an n-contact, can be formed at the height of the recombination zones 2 or on the upper side of the Pillars P. Each Pillar P generates an individual pixel.

The emission of light parallel to the longitudinal axis of the light-emitting diodes 13 in the form of pillars as shown in FIGS. 25a to 26b is increased. This improves the directionality of the emitted light compared to conventional light emitting diodes with a small aspect ratio. Compared to an arrangement according to FIGS. 22a to 24b, the process of light generation can be influenced much more by an arrangement according to FIGS. 25a to 26b, whereby a high directionality and efficiency can be achieved.

FIG. 27 shows a cross-sectional view of a further optoelectronic device in which a two-dimensional photonic crystal K is arranged above a layer with an array-like arrangement of light sources with recombination zones 2. In this case, the photonic crystal K is arranged close to the recombination zones 2 in such a way that the photonic crystal K changes an optical density of states present in the region of the recombination zones 2, in particular in such a way that a band gap is generated for at least one optical mode with a propagation direction parallel and/or at a small angle to the light emitter surface 21 and/or the density of states is increased for at least one optical mode with a propagation direction perpendicular to the light emitter surface 21.

This can be achieved in particular by ensuring that the height H of the photonic crystal K is at least 300 to 500 nm, preferably up to 1 μm. The height H of the photonic crystal may depend on the high refractive index material of the photonic crystal.

Furthermore, preferably a distance A between the center M of the recombination zones 2 and the bottom of the photonic crystal K is at most 1 μm and preferably a few nm.

In all described embodiments with a photonic crystal K, it is preferably a two-dimensional photonic crystal which comprises a periodic variation of the optical refractive index in two mutually perpendicular spatial directions which are parallel to the light-emitting surface. Furthermore, it is preferably a pillar structure comprising an array-like arrangement of pillars P or columns with the longitudinal axis L of the pillars P being perpendicular to the light emitting surface 21.

Possible fields of application of devices described herein are, for example, automotive, lighting of any kind, consumer electronics, video walls.

Features mentioned in connection with one embodiment and/or claim may also be combined with other embodiments and/or claims, even if not mentioned in connection therewith.

The invention claimed is:

1. An optoelectronic device, comprising:
an arrangement comprising a plurality of light sources for generating light emerging from a common light emitting surface from the optoelectronic device; and
one common and uninterrupted photonic structure disposed between the light emitting surface and the plurality of light sources,
wherein the one common and uninteruppted photonic structure is a photonic crystal that is arranged with respect to a plane parallel to the light-emitting surface independently of the positioning of light sources of the plurality of light sources.

2. The optoelectronic device according to claim 1, wherein the one common and uninterrupted photonic structure is designed for beam shaping of the light generated by the light sources, in particular in such a way that the light emerges at least substantially perpendicularly from the light emitting surface.

3. The optoelectronic device according to claim 1, wherein the device is an array comprising a plurality of pixels as light sources arranged in a layer, and that the photonic crystal is arranged or formed in the layer.

4. The optoelectronic device according to claim 1, wherein the device is an array comprising as light sources a plurality of pixels arranged in a first layer, and that the photonic crystal is arranged in a further, second layer, the second layer being located between the first layer and the light emitting surface.

5. The optoelectronic device according to claim 1, wherein the device comprises as light sources a plurality of LEDs arranged in a first layer, and that the photonic crystal is arranged in the further, second layer, the second layer being located between the first layer and the light emitting surface.

6. The optoelectronic device according to claim 1, wherein each of the light sources comprises a recombination zone and the photonic crystal is located close to the recombination zones in such a way that the photonic crystal changes an optical density of states present in the region of the recombination zones, in particular in such a way that a photonic band gap is generated for at least one optical mode with a propagation direction parallel and/or at a small angle to the light emitting surface.

7. The optoelectronic device according to claim 1,
wherein the photonic crystal is a two-dimensional photonic crystal which exhibits a periodic variation of an optical refractive index in two mutually perpendicular spatial directions spanning the plane.

8. The optoelectronic device according to claim 1, wherein said photonic structure comprises a plurality of pillar structures extending at least partially between said light emitting surface and said plurality of light sources, each pillar being associated with a corresponding light source and aligned with said light emitting surface as viewed in a direction perpendicular thereto.

9. The optoelectronic device according to claim 8, wherein the arrangement comprises as light sources a plurality of LEDs arranged in a first layer, and that the pillars are arranged or formed in a further, second layer, the second layer being located between the first layer and the light emission surface.

10. A method of manufacturing the optoelectronic device according to claim 1,
wherein the arrangement having the plurality of light sources for generating the light emerging from the common light emitting surface from the optoelectronic device is provided or fabricated; and
the one common and uninterrupted photonic structure is disposed between the common light emitting surface and the plurality of light sources.

* * * * *